US012399967B2

(12) United States Patent
Elbaum

(10) Patent No.: US 12,399,967 B2
(45) Date of Patent: Aug. 26, 2025

(54) DIGITAL VERIFICATION SYSTEMS AND METHODS

(71) Applicant: Callpilot LLC, Draper, UT (US)

(72) Inventor: Jack Elbaum, Allen, TX (US)

(73) Assignee: Callpilot LLC, Draper, UT (US)

( * ) Notice: Subject to any disclaimer, the term of this patent is extended or adjusted under 35 U.S.C. 154(b) by 78 days.

(21) Appl. No.: 18/593,611

(22) Filed: Mar. 1, 2024

(65) Prior Publication Data

US 2024/0296210 A1  Sep. 5, 2024

Related U.S. Application Data

(60) Provisional application No. 63/487,788, filed on Mar. 1, 2023.

(51) Int. Cl.
*G06F 21/31* (2013.01)
*G06F 21/32* (2013.01)

(52) U.S. Cl.
CPC ............ *G06F 21/316* (2013.01); *G06F 21/32* (2013.01)

(58) Field of Classification Search
CPC .............................. G06F 21/32; G06F 21/316
See application file for complete search history.

(56) References Cited

U.S. PATENT DOCUMENTS

| | | | |
|---|---|---|---|
| 9,264,764 B2 | 2/2016 | Bhatia et al. | |
| 9,666,088 B2 | 5/2017 | Dalal et al. | |
| 2009/0207982 A1* | 8/2009 | O'Connell | H04M 3/53366 379/88.23 |
| 2014/0108054 A1 | 4/2014 | Udani | |
| 2018/0349638 A1* | 12/2018 | Barraclough | H04L 63/0428 |
| 2019/0012470 A1* | 1/2019 | Ross | G06T 15/005 |
| 2019/0050549 A1* | 2/2019 | Reilly | G06F 21/31 |
| 2020/0034551 A1* | 1/2020 | Cantrell | H04L 9/3247 |
| 2020/0320457 A1 | 10/2020 | Bucior, III et al. | |
| 2020/0394290 A1 | 12/2020 | Tussy | |
| 2021/0142782 A1* | 5/2021 | Wolf | G06N 3/08 |
| 2021/0319465 A1 | 10/2021 | Rinzler et al. | |
| 2022/0174153 A1 | 6/2022 | Spohrer | |
| 2022/0310250 A1 | 9/2022 | Ferro, Jr. et al. | |
| 2024/0283989 A1* | 8/2024 | Kulkarni | H04N 21/23106 |

OTHER PUBLICATIONS

Seemesign, "Automated Contract Verifications," <https://seemesign.com/> web page available at least as early as Apr. 4, 2024 (4 pages).

* cited by examiner

*Primary Examiner* — Chris Parry
*Assistant Examiner* — Abderrahmen Chouat
(74) *Attorney, Agent, or Firm* — Michael Best & Friedrich LLP

(57) ABSTRACT

Computer-implemented methods and systems for conducting and generating a record of a digital interaction conducted via an end user using a software application installed on a user device. One method includes, in response the digital interaction starting, continuously recording the digital interaction on the user device, wherein recording the digital interaction includes storing one or more user interfaces displayed on the user device during the digital interaction, image data captured via a camera of the user device during the digital interaction, and audio data included in the digital interaction. The method also includes, in response to the digital interaction ending, uploading the recording of the digital interaction from the user device to at least one server over at least one computer network.

18 Claims, 19 Drawing Sheets

DIGITAL VERIFICATION SYSTEMS AND METHODS

RELATED APPLICATIONS

This application claims priority to U.S. Provisional Application No. 63/487,788, filed Mar. 1, 2023.

FIELD

Embodiments described herein generally relate to systems and methods for conducting and recording a digital transaction or interaction and, in particular, systems and methods for executing a digital interaction with a user using a cloud-based system and creating a recording of the interaction for auditing, verification, or various other purposes.

SUMMARY

As more transactions and user interactions are conducted in a remote, digital fashion, it becomes difficult to capture sufficient information documenting the transaction as well as verifying that the interaction was conducted as intended. For example, a user may remotely agree to a transaction, such as a purchase, a mortgage or other financing proposal, or the like but it may be difficult to confirm that the user read or heard all the terms, agreed to the terms, and accepted the terms in such a remote situation. Also, existing verification methods and systems may be susceptible to bots and other automated systems that may attempt to act on behalf of or otherwise impersonate a user. Accordingly, existing technology for performing digital verification suffers from deficiencies.

To address these and other deficiencies, embodiments described here provide improved digital verification technology. Embodiments described herein may focus on conducting digital calls or surveys between a user and an avatar or pre-recorded actor or graphics, such as, for example, for use with third-party verification (TPV). However, it should be understood that embodiments described herein can be used with various types of interactions and transactions are not limited to surveys. Furthermore, embodiments described herein may be used with user-to-user interactions and are not limited to interactions between a user and an avatar or recorded media content.

For example, some embodiments described herein provide a digital verification application configured to generate and upload a recording (e.g., a video and audio recording) of a call or survey conducted within the application between an end user and an avatar or recorded video or other user interfaces. Such verification calls or surveys may be used as part of a financial transaction (e.g., applying for loan, opening a bank account, etc.), execution of a legal document, completion of an online course or test, or other situations where a record of a digital interaction with a user is useful or required for compliance or record keeping purposes, such as, for example, to prove an identity of a user or confirm that a user had particular knowledge or agreed to particular terms. A provider creating a call available through the application by defining questions and introductions and conditions for how questions are presented (e.g., a sequence (including dynamic sequences that depend on user answers), a language, etc.). These conditions can also control presented questions and information based on user demographics, which may be supplied by the end user during the call or pulled from various databases or sources. The conditions may also take into account a detected emotion of a user during a call. For example, images and/or video captured during a call may be input to an image-based emotion detection module, system, or service and the result or output (e.g., indicating whether the user is confused, happy, surprised, etc.) can be used as a condition to control the next question or content presented to the user. The defined questions, introductions, conditions or a combination thereof can be pushed through the application without requiring software or code updates and, thus, allow a provider to quickly create and modify a call. Also, when an end user is completing a call/survey, the end user's answers or selections can be displayed on the screen, which allows the end user to verify their input. The recording of the call/survey may capture the user's screen (or a portion thereof), which may include captured video of the user. For example, as illustrated in FIG. 1, a user interface 5 presented through the application may include a first window 10 displaying captured video of the end user (e.g., captured by a camera included in the end user's device, such as a smart phone), a second window 12 showing the presented avatar or recorded media, and a third window 14 showing information presented to the end user or the end user's selection or input (which may be provided via voice commands, user selections (e.g., on the touch screen), inputted text, or a combination thereof). The user interface 5 may also include various user controls for taking actions during the call, such as, for example, canceling the current call.

The recording is uploaded to one or more computing devices (e.g., servers, databases, etc.) in the system and may be uploaded (as a partial recording) regardless of whether the end user cancels an in-progress call, the application crashes, the user closes the application, or the like. For example, in some embodiments, un-uploaded recording data may be stored and transmitted to the system as part of a shut-down, exception, or background process of the application, a recovery process for the application, or a combination thereof. Also, in some embodiments, the upload is performed in real-time (or approximately real-time), which helps ensure that all recordings are updated to the system. Also, in some embodiments, the recoding is continuous in the sense that the user cannot pause or stop the recording or manually prevent the recording from being uploaded. In addition, as described in more detail below, interruptions from other calls (i.e., phone calls), messages, notifications, etc. may not interrupt or stop the recording, which again ensures that a call can be completed, and a corresponding recording is uploaded.

As described in more detail below, the application may be configured to pause the recording, prevent the call from starting (e.g., based on battery status), or taking other action to ensure that a proper recording is generated. Uploaded recordings may be processed (e.g., in real-time) to track progress, obtain user's answers or selection, or the like. Alternatively or in addition, the application may upload user answers and selections separate from the recordings. Other information (metadata) may be uploaded with the recordings, such as, for example, geolocation information (representing where the user was located when the recording was generated), time and date information, device information (e.g., type of device, status of device, etc.). This information can be stored as metadata associated with a survey and, in some embodiments, may be used to verify the end user.

As noted above, in some embodiments, the application is configured to detect particular situations as part of ensuring that an appropriate recording is generated. For example, the application may be configured to perform facial detection on the captured video of the end user (e.g., as presented within the recording). The facial detection may be sued to ensure that the user's face is viewable for the call (i.e., to prove the user viewing the presented information). For example, in some embodiments, if the user moves his or her head out of the frame (i.e., the window 10 displaying the captured video of the end user, see FIG. 1), the application automatically pauses the call and the end user is instructed (via an audible instruction, text instruction, or the like) to move their face back into view to continue the call (see, e.g., FIG. 11). The application automatically continues the call (and, in some embodiments, the associated recording) in response to the user's face being detected again within the frame. It should be understood that the facial recognition process can be performed locally on the end user's device, on a server communicating with the end user's device, or a combination thereof. Also, in some embodiments, the call may be resumed after the user's face is detected for a predetermined period of time (e.g., to prevent repeated stopping and starting of the call and, optionally, the recording).

Alternatively or in addition, the application may be configured to detect the microphone settings, speaker settings, or both on the user's device (e.g., via one or more API calls or operating system calls on the user's device) and, in response to the volume setting being less than a predetermined threshold (e.g., less than 50% of a maximum volume level), the application automatically pauses the call and instructs the end user to turn up the volume to continue the call. The application automatically continues the call (and, in some embodiments, the associated recording) in response to the detected volume satisfying the predetermined threshold.

Alternatively or in addition, the application may be configured to detect the battery level of the user's device (e.g., via one or more API calls or operating system calls on the user's device) and, in response to the battery level being less than a predetermined threshold (e.g., less than 50% of a maximum battery level), the application automatically pauses the call and instructs the end user to plug in the device to a power source to ensure that the call can be successfully completed before the user's phone runs out of power. In some embodiments, the application checks for a proper battery level prior to starting a call and will not allow the user to start the call until the device is either plugged into an external power source or reaches a predetermined battery level. For example, in some embodiments, when the battery level is less than 20% of a maximum battery level, the application may be configured to warn the end user that he or she should charge or plug in their device to ensure that the call can be completed but when the battery level is less than 5% of a maximum battery level, the application may be configured to automatically prevent the user from starting the call. Alternatively or in addition, the application may check the battery level during an active call and may automatically pause the call in response to the battery level dropping below a threshold. In this situation, the application automatically continues the call (and, in some embodiments, the associated recording) in response to the battery level reaching the predetermined level or the user device being powered (charged) via an external power source. In some embodiments, the predetermined battery level may be determined by the application and/or may vary based on the length of the call (e.g., based on number of questions, estimated time provided by call provider, historical time spent, or the like).

Alternatively or in addition, the application may be configured to detect notifications presented on the user device associated with other applications or functions (e.g., via one or more API calls or operating system calls or interactions on the user's device) and, in response to detecting a notification or associated function (e.g., an incoming phone call or other communication), the application automatically pauses the in-progress survey, which allows the end user to respond to the notification (e.g., answer an incoming phone all). In some embodiments, when the survey is paused, the recording is also paused. However, in other embodiments, the recording may continue even when the survey is paused. For example, when the application detects an incoming call or communication during an in-progress survey (e.g., using dual call functionality provided by the user device's operating system), the application may pause the survey and the recording, which may, for example, allow the user to conduct a private call or other communication rather than having the call or communication recorded as part of the survey recording (e.g., even when the call or communication is completely unrelated to the survey being conducted by the application). In other words, when a notification is detected, the recording of the survey can be paused, which allows the user to answer the in-coming call or take another action to respond to the notification and subsequently return to the survey to have the recording resume the survey without having to start the survey over from the beginning. The generated recording will not include the time the user responded to the notification (e.g., answered the in-coming call) and, rather, only the survey will be included in the recording. Without this feature, an end user may end or otherwise cancel an in-progress survey within the application to answer an important incoming call or otherwise respond to an incoming communication. While canceling the active survey may still allow a recording to be generated, since the end user did not complete the survey, multiple recordings may be generated, which wastes computing resources (e.g., bandwidth, memory, etc.) and, in some situations, the user may be required to subsequently restart the previously-started survey, which, again, wastes computing resources as well as end user time.

As noted above, generated recordings are uploaded to the system and can be used for verification or auditing purposes. These recordings may include significant data, which may require extensive memory resources and bandwidth requirements. Accordingly, in some embodiments, to limit the amount of data included in an upload, parts of the call may be flagged by the call provider as "do not record," which does not record the interaction when the particular flagged question or information is presented. For example, introduction information that provides an overview of using the application may be flagged as "do not record" by the provider to control the amount of data included in the recording and uploaded to the system. In some embodiments, data may be included in the recording regarding a skipped portion of the call, such as, for example, an identifier of a question or other content that was displayed and timing information for such information.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, and aspects of concepts that include the claimed subject matter and explain various principles and advantages of those embodiments, examples, and aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

DETAILED DESCRIPTION OF THE INVENTION

Figure 1:
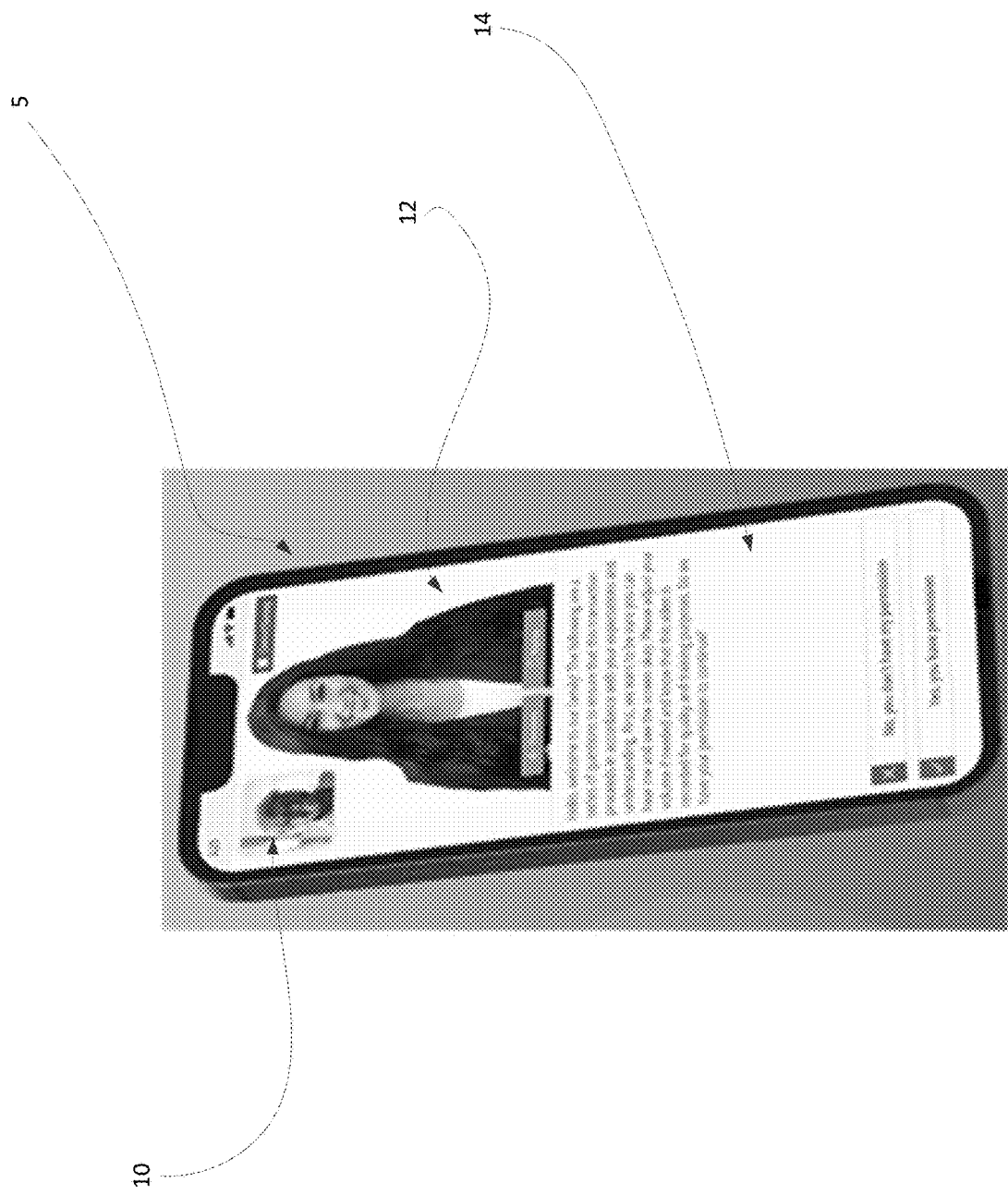
FIG. 1 illustrates a user interface provided via a verification application executed on an end user device according to some embodiments.

As described above in the summary, embodiments described herein provide systems and methods for performing digital verification wherein an interaction with an end user (which may be an interaction between two or more users, an interaction between a user and an avatar or recorded content, or a combination thereof) is recorded by recording a user interface presented to the end user on the end user's computing device, wherein the user interface includes a window displaying video data captured by the user's computing device (e.g., a camera included in the device) (see, e.g., FIG. 1). The application generating the recording is configured to detect one or more situations that may impair the accuracy or usability of the generated recording and may automatically pause the interaction (e.g., the call or survey), the recording, or both and instruct the end user (or the user's device) to take one or more actions before the call (and associated recording) is automatically resumed. Further details of such systems and methods and associated functionality are provided below.

For ease of description, some or all of the example systems presented herein may be described with a single exemplar of each of its component parts. Some examples may not describe or illustrate all components of the systems. Other examples may include more or fewer of each of the illustrated components, may combine some components, or may include additional or alternative components. For example, embodiments described may represent the system as including a single server, a single end user device, and a single provider device, but it should be understood that systems may include multiple servers (or other types of devices, such as, for example, one or more databases), multiple end user devices, multiple provider devices, or a combination thereof. Also, although not explicitly described, the components of these systems may communicate through various intermediary devices (e.g., routers, firewalls, modems, etc.).

It should be understood that embodiments described herein may be configured in various combinations of hardware and software (including firmware) and functionality implemented via software may be distributed and combined in various applications or modules executed by one or more electronic processors. For example, instead of being executed by a single electronic processor, processing may be distributed among multiple electronic processors, which may be located in the same piece of hardware or separate devices. The devices included in the system may communicate over one or more networks, connections, or other suitable communication links.

It should also be understood that, while some examples are described herein with respect to conducting surveys (also referred to herein as "calls"), the systems and methods described may be applied to different types of services and uses and are not limited to survey completion. For example, embodiments, described herein may be used to execute agreements, conduct virtual interviews (e.g., for hiring or acceptance purposes), administer various tests or curriculum or any other situations where validation is useful or required for a user interaction conducted via the user's device. For example, embodiments described herein may be used within a learning management system or service wherein curriculum, tests, and other content associated with a learning institution may be provided and recorded. Embodiments described herein may also be used to provide an interactive interview, wherein various prompts may be provided as part of the survey and responses from the user (presented as text input, speech input, mechanism selections, or a combination thereof) are recorded as part of the interview. In some embodiments, time constraints may be implemented through the call, where, for example, the system prompt the user for input starting at a particular time (e.g., by turning a button or icon "green," turning on a user's microphone, activating input or selection mechanisms on a user interface, or a combination thereof) and may only record input received for a predetermined time period. For example, a user may be allowed a predetermined time period (e.g., 30 seconds, 1 minute, 2 minutes, 5 minutes, 30 minutes, or the like) to provide a response.

Figure 2:
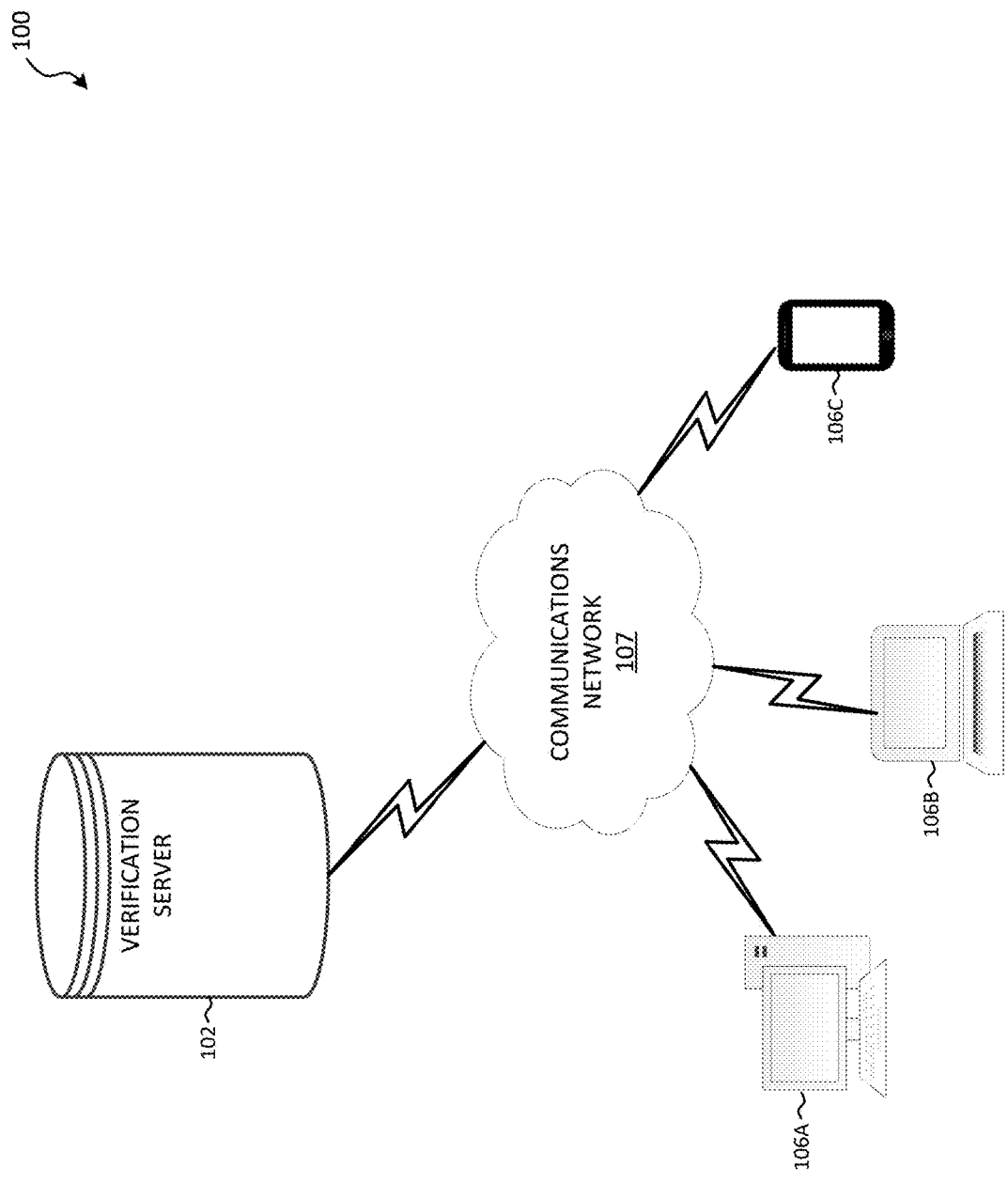
FIG. 2 schematically illustrates a verification system according to some embodiments.

FIG. 2 is a diagram of one example of a verification system 100 in accordance with some embodiments. As explained in more detail below, the verification system 100 is configured to, among other things, manage and store surveys defined by one or more providers, wherein the surveys are accessible by one or more end users and are used, for example, for digital verification. As illustrated, the system 100 includes a verification server 102 and one or more electronic communications devices 106A-106C (singularly referred to herein as an electronic communications device 106), wherein an electronic communication device 106 may also be referred to herein as a user or end user device and may be used by a provider of a survey, an end user of a survey, or both. The system 100 may include additional or fewer components than those illustrated. For example, although FIG. 2 illustrates only three communications devices 106A-106C, the system 100 may include fewer or additional communications devices. As another example, in some embodiments, the functionality described herein as being performed via the verification server 102 may be distributed among multiple servers, databases, or the like. For example, in some embodiments, the system is provided as a cloud-based system or platform and, in some embodiments, the server 102, the device 106, or both may be configured to access one or more databases, such as, for example, one or more databases of a call provider. These databases may be used to obtain demographic information of a user, upload new or updated information received from a user during a call, uploaded call results, or a combination thereof.

As illustrated, the electronic communications devices 106A-106C are communicatively connected (via a suitable wired or wireless connection or some combination thereof) to the verification server 102 via a communications network 107. The communications network 107 may be implemented via one or more wired connections, wireless connections, or a combination thereof. In some embodiments, the communications network 107 includes a wireless communications network, which may be implemented various local and wide area networks, for example, a Bluetooth™ network or a Wi-Fi™ network, the Internet, or combinations or derivatives thereof.

The verification server 102 may include one or more physical server computer systems, virtual private servers (VPSs), (for example, a cloud-based server), and the like. The verification server 102 hosts a software application, which is accessible to the one or more remote computing devices (for example, the electronic communication devices 106A-106C) via, in some embodiments, a web browser. In some embodiments, the verification server 102 the remote computing devices execute the application in a shared fashion (for example, in a client-server arrangement). In further embodiments, the electronic communication device 106 may store and implement a local, dedicated application for accessing and communicating with the verification server 102. As noted above, in some embodiments, the verification server 102 is part of a cloud-based server network.

The electronic communications devices 106A-106C may be any electronic computing device capable of implementing the verification application or associated functionality as described herein. The electronic communications device 106 may be, for example, a computer, a laptop, an electronic tablet, a cellular (smart) phone, a smart wearable, and the like. In some instances, the electronic communications devices 106A-106C are different types of devices. For example, as illustrated in FIG. 2, the device 106A is a desktop computer, the device 106B is a laptop, and the device 106C is an electronic smartphone. In some instances, the electronic communications devices 106A-106C are all the same type of device.

The electronic communications devices 106A-106C, described in more detail below, are configured to execute a verification application to, among other things, access one or more surveys provided via the system 100 and generate one or more user interfaces for providing the survey to a user of the device 106 as described herein. Accordingly, as also described in more detail below, each electronic communications device 106 may include a display (for example, a touchscreen) for providing one or more user interfaces and, optionally, receiving input from a user during the survey (e.g., through the touchscreen, a button or keypad, a microphone, or the like).

Figure 3:
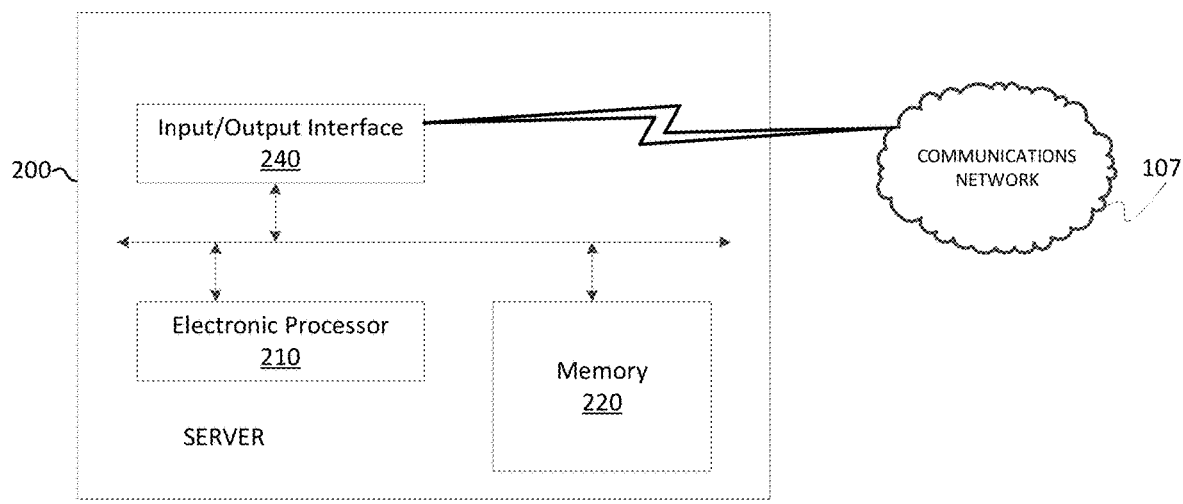
FIG. 3 schematically illustrates a server included in the verification system of FIG. 2 according to some embodiments.

FIG. 3 schematically illustrates one example of the verification server 102 in accordance with some embodiments. In the example illustrated, the server 102 includes an electronic processor 210, a memory 220, and an input/output (I/O) interface 240. The electronic processor 210, the memory 220, and the input/output interface 240 communicate over one or more control and/or data buses (e.g., a communication bus 250). It should be understood that FIG. 3 illustrates only one example of the server 102, and the server 102 may include additional or fewer components and may perform functions other than those explicitly described herein.

In some instances, the electronic processor 210 is implemented as a microprocessor with separate memory, such as the memory 220. In other instances, the electronic processor 210 may be implemented as a microcontroller (with memory 220 on the same chip). In other instances, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the verification system as described herein. The memory 220 may include, for example, a program storage area and a data storage area. The program storage area and the data storage area may include combinations of different types of memory, such as read-only memory and random-access memory.

The I/O interface 240 may include one or more ports (e.g., for receiving one or more wired cables or connections), transceivers, transmitters, receivers, or a combination thereof for communication with one or more devices or networks external to the server 102, such as, for example, the electronic communications devices 106A-106C.

Figure 4:
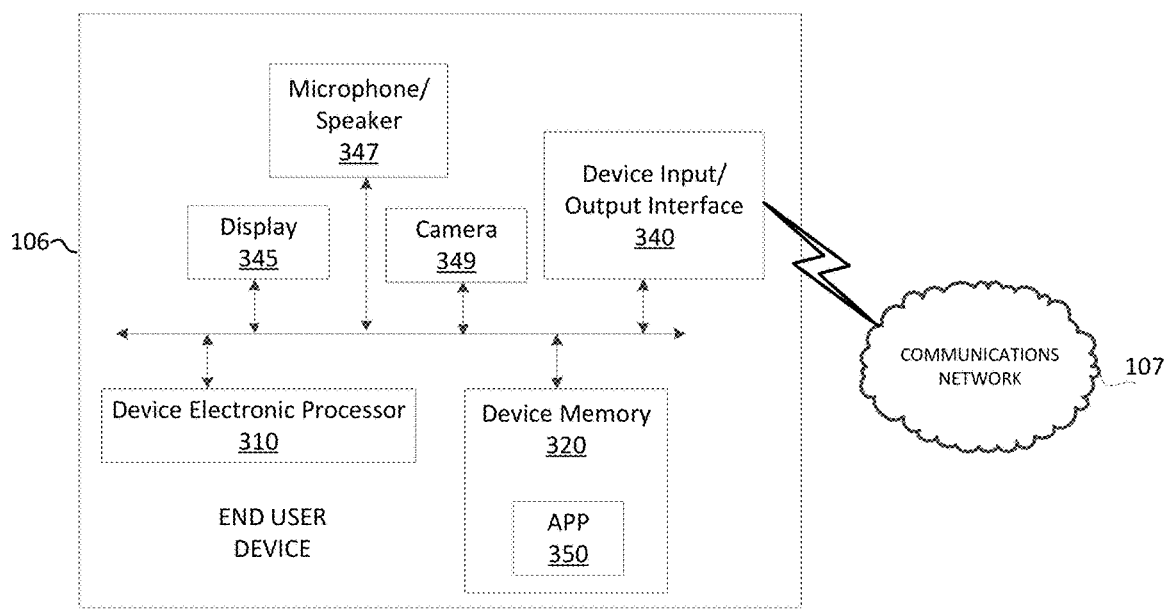
FIG. 4 schematically illustrates an end user device included in the verification system of FIG. 2 according to some embodiments.

FIG. 4 schematically illustrates an electronic communications device 106 according to some examples. In the particular example illustrated, the electronic communications device 106 includes, among other things, a device electronic processor 310, a device memory 320, and a device input/output (I/O) interface 340. The device electronic processor 310, the device memory 320, and the device I/O interface 340 communicate over one or more control and/or data buses (e.g., a device communication bus). FIG. 4 illustrates only one example of the electronic communications device 106, and the electronic communications device 106 may include more or fewer components than illustrated and may perform additional functions other than those described herein.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein. For example, as illustrated in FIG. 4, in some embodiments, the memory 330 stores a verification application (or "app") 350 that, when executed by the device electronic processor 310 performs the functionality described herein or a portion thereof.

The device I/O interface 340 enables communication (e.g., wired, wireless, or a combination thereof) from the electronic communications device 106 to, for example, the server 102 via the communications network 107 similar to the I/O interface 240 described above with respect to FIG. 2.

As illustrated in FIG. 4, in some embodiments, the electronic communications device 106 includes one or more human machine interfaces (HMI) for providing output to and receiving input from a user of the device 106. For example, the electronic communications device 106 may include a display 345, a microphone/speaker 347, and a camera 349. These components may be combined and distributed in various combinations. For example, in some embodiments, the microphone/speaker 347 may be provided as separate components and, in some embodiments, one or both of these components may be integrated with the camera. It should be understood that the device 106 may include additional input devices, output devices, or a combination thereof, such as, for example, a keypad, a keyboard, a button, a knob, a dial, one or more LEDs, a printer, a vibration motor (for providing tactile output), or a combination thereof.

The display 345 is a suitable display such as, for example, a liquid crystal display (LCD) touch screen, or an organic light-emitting diode (OLED) touch screen. In some instances, the electronic communications device 106 implements a graphical user interface (GUI) (e.g., generated by the electronic processor 310, from instructions and data stored in the memory 320, and presented on the display 345), that enables a user to interact with the device 106.

Figure 5:
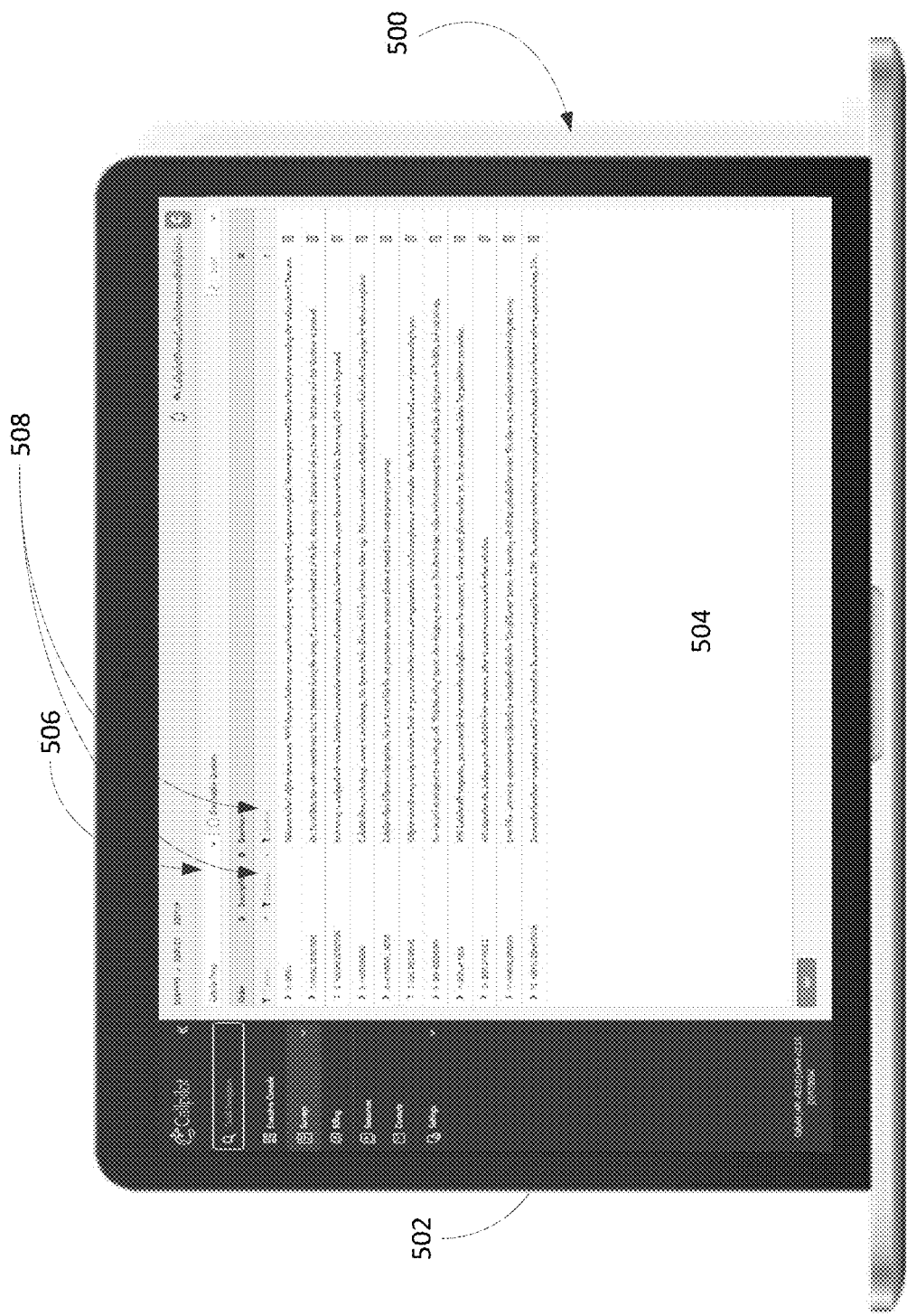
FIG. 5 illustrates a user interface provided via the verification system of FIG. 2 for creating or modifying a survey according to some embodiments.

As described above, the system 100 may be used by both call providers (i.e., entities creating or modifying a call) and end users, who may operate an electronic communications device 106 to access and interact with the system 100. In some embodiments, a call provider may download a dedicated application to create and modify calls. Alternatively or in addition, a call provider may access a web site or web service associated with the system that allows the provider to create, modify, or both a call. As illustrated in FIG. 5, the system 100 provides one or more user interfaces (such as user interface 500 in FIG. 5) to a call provider that allows the provider to edit, add, and remove content (e.g., questions, sub-questions, etc.) from a call as well as designate the sequence or flow of the call (e.g., by defining various paths based on user inputs or behavior during the call, user demographics (pulled from the user directly or indirectly), user emotions, or a combination thereof. In some embodiments, a provider can also upload customized content (e.g., video questions) to create a multi-media experience. For example, in the user interface 500, a call provider has selected a "surveys" option from a menu 502, which causes a list 504 of surveys associated with call provider (i.e., surveys the call provider has access to) to be displayed. The list 504 may be searchable (e.g., using a text box 506) and/or filterable (e.g., using one or more category or field selection mechanisms 508). Each survey included in the list 504 (e.g., represented as a row in the list), may be selectable, wherein, in response to receiving a selection of a particular survey, other user interfaces may be provided to providing additional information regarding the selected survey, such as, for example, a list of questions, usage statistics, and the like. The user interfaces may also allow the call provider to edit displayed information associated with the selected survey (e.g., according to the call providers/users access rights to the displayed information).

Figure 6:
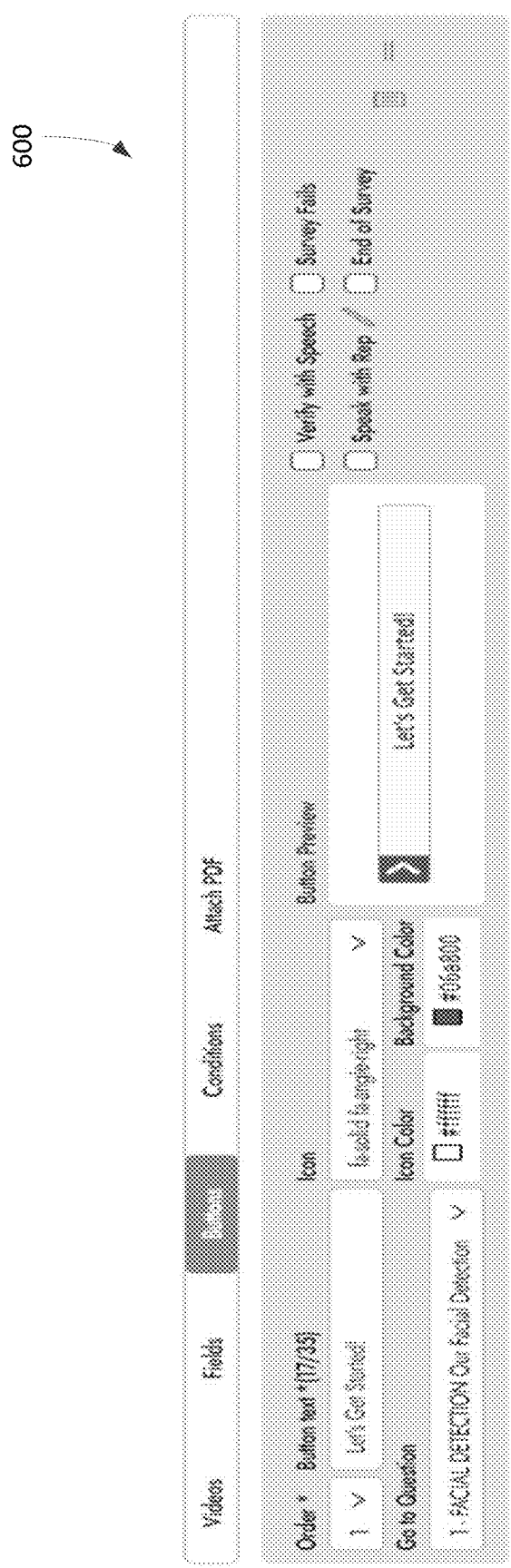
FIG. 6 illustrates a user interface provided via the verification system of FIG. 2 for customizing a survey according to some embodiments.

In some embodiments, as illustrated in user interface 600 of FIG. 6, various aspects of the call are customizable by the provider, such as, for example, font, size, color, descriptions, and icons (including options in various languages), as well as the order and flow of the presented information (e.g., questions) and various constraints (e.g., whether a particular answer or input ends the survey, causes the survey to fail, or connects the user with a representative) and conditions (e.g., whether an answer needs to be verified with speech, e.g., in addition to selecting an option on the user interface 600).

Figure 7:
FIG. 7 illustrates a user interface provided via the verification system of FIG. 2 for tracking survey results and statuses according to some embodiments.

In some embodiments, the system also allows a provider to access in-depth analytics and reporting, such as, for example, one or more user interfaces like the user interface 700 presented in FIG. 7. For example, the system allows a provider to drive performance through automation, which allows a provider to build effective surveys that align with targeted end users (e.g., customers) and provider goals. For example, a provider may be allowed to manage multiple users within the provider's account with the system, which allows a provider enhanced control over calls, including visibility over collected call data (including all data collected across all surveys), including viewing survey questions and responses at a glance and view whether and where within an in-progress call a survey was stopped, paused. Collected geographical and device data for users can also be provided within one or more user interfaces. All of this information allows a provider to monitor and react to survey progress, and, as noted above, the provider can easily modify an existing survey (even after it's been pushed or published to end users) or create a new survey to respond to such progress or changing needs or goals through one or more user interfaces without the need for software or code updates. For example, as illustrated in FIG. 7, the user interface 700 may provide one or more statistics for each survey and/or individual calls conducted for one or more surveys, such as, for example, a location a call was conducted from, a device used to conduct the call, an internet service provider associated with the user and/or device, a battery level of the device used to conduct the call, a duration of the call, whether a call was conducted with video, whether the call passed or failed, whether the call was stopped, whether the call was completed, date and time information regarding when the call was conducted, date and time information regarding when recording of the call and associated data was updated to the system, a file size of the upload, and the like. In some embodiments, different data fields presented through the user interface 700 can be configurable by the call provider to customize the type of information included in the dashboard and/or the order or layout of provided information.

After a provider creates or modifies a survey (e.g., through one or more user interfaces provided via the system), the survey can be pushed or published, which means that the survey is accessible by one or more end users. To access a survey, an end user may download a dedicated application (also referred to as the "verification application, the "digital verification application," the "application," or the "application 350" herein) to their user device (e.g., a smart phone, smart watch or other wearable, tablet computer, desktop or laptop computer, or the like). Alternatively, a user may access the survey through a browser application configured to access a website or webservice of the system. In some embodiments, the provider may make a survey publicly accessible or may provide links, credentials, or other information to limited end users. For example, when used as part of a transaction, a provider (again through one or more user interfaces provided by the system) may specify an end user (e.g., by email, phone number, or other contact information) for the survey and the system may send an automated message (e.g., text message, email message, chat message, etc.) to the user with a link for accessible the designated survey.

As described above, when completing a survey through the application, the application generates a recording of the interaction, wherein the recording may record (e.g., audio and video) the user interface provided via the application on the user's device, which includes, in some embodiments, captured video of the user. The recording is uploaded to the system (e.g., one or more servers or databases) and may be uploaded with various metadata (e.g., user location, user device, time and date, survey answers or selections, etc.). As described above, a provider may also control what aspects of a call are recorded, such as, for example, setting specific questions (through one or more provided interfaces) as being excluded from the recording (see, e.g., the user interface 1600 illustrated in FIGS. 16 and 17). While the end user will still see all the questions asked on the application during the survey, some questions may not be recorded and uploaded, which, as described above, reduces bandwidth, memory storage, and other needed computing resources while also giving the provider even more control over their call.

Figure 16:
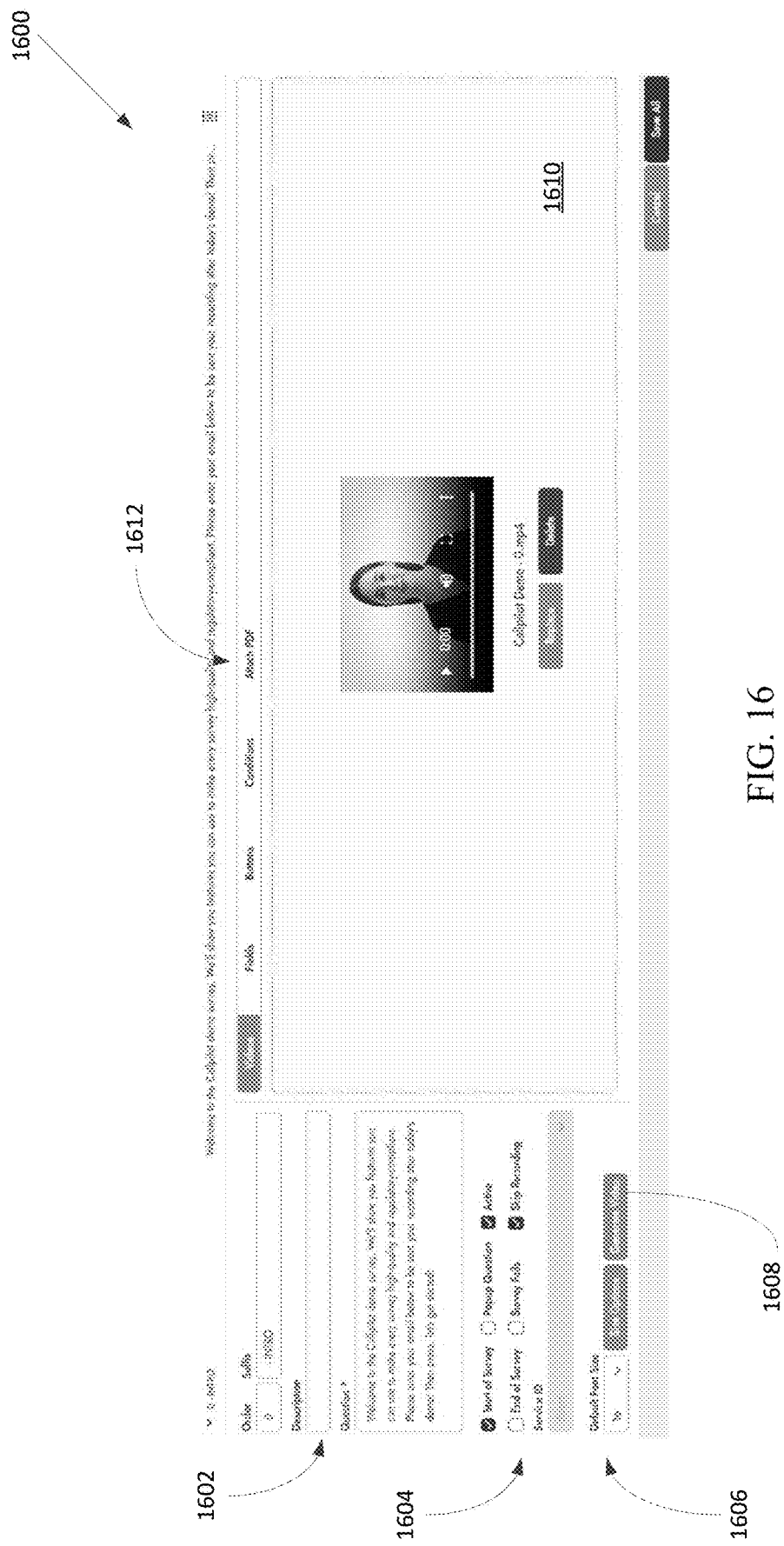
FIGS. 16 and 17 illustrates user interfaces provided via the verification system of FIG. 2 for flagging content for inclusion or exclusion from the generated recording according to some embodiments.
Figure 17:
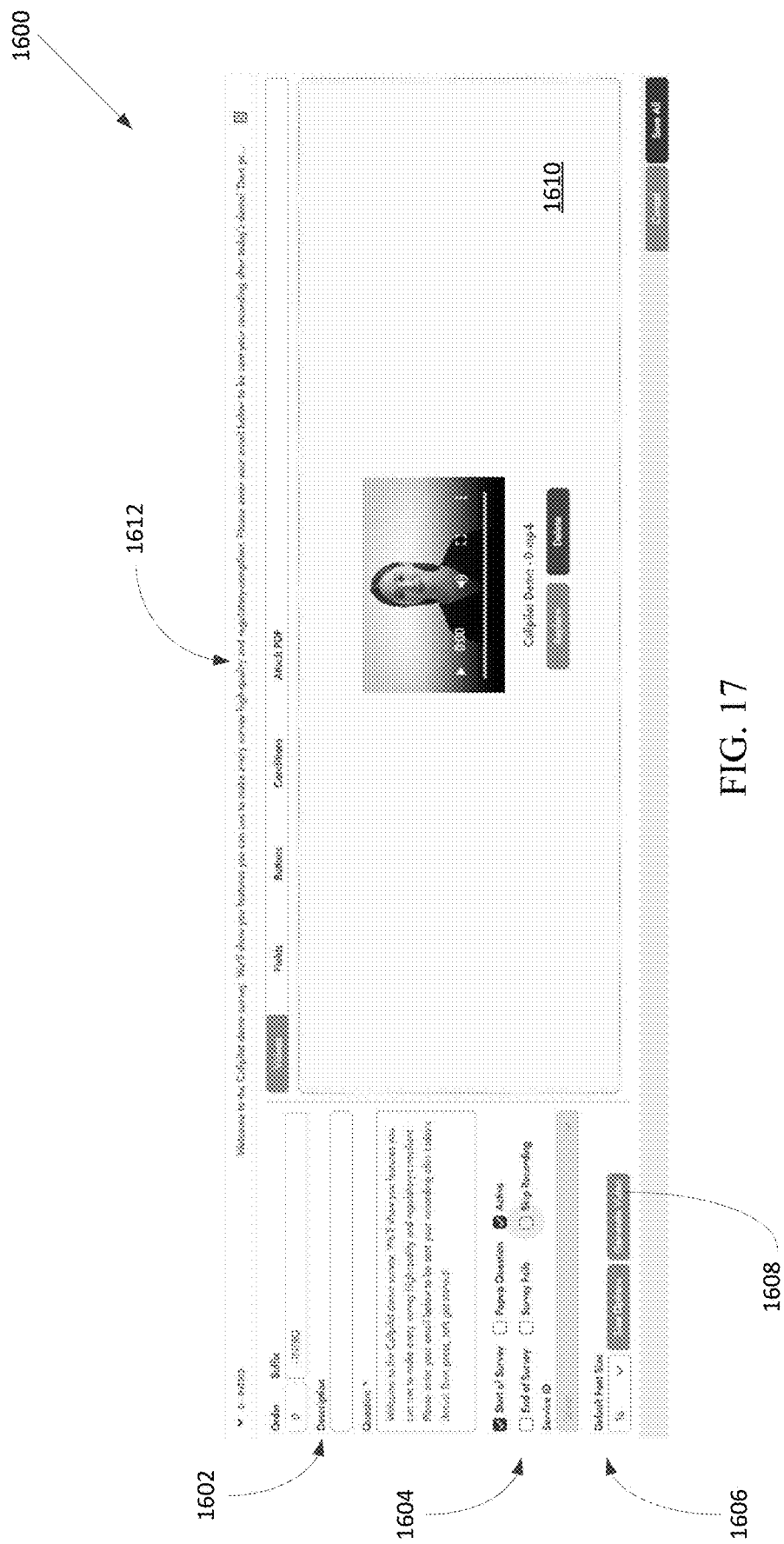

For example, as illustrated in the user interface 1600 illustrated in FIGS. 16 and 17, in some embodiments, the user interface 1600 may include one or more selection mechanisms (e.g., one or more input or text boxes 1602, one or more check boxes 1604, or a combination thereof) selectable by the call provider to, for example, designate an order and/or sequence of a question within a survey, provide a description or label for a question, specify the question (which may be required), specify whether the question represents the start of the survey or the end of the survey, specify whether the question is provided as a popup, specify whether the question is active, specify whether a survey fails if the question is not answered or answered in a particular way, specify whether recording is skipped for the question, or a combination thereof. As also illustrated in FIGS. 16 and 17, the user interface 1600 may include one or more selection mechanisms 1606 to specify a font, font size, and other font, sizing, or positioning information for the question. In some embodiments, the user interface 1600 also includes a selection mechanism 1608 (e.g., a button) that allows the call provider to generate a video file for a question (e.g., in real-time as part of creating or modifying a surface). For example, as illustrated in FIGS. 16 and 17, in response to selection of the button 1608, a video may be generated of an avatar providing the as-defined question (e.g., in a selected language, which may differ than the language the question was defined in) and displayed within a panel or portion 1610 of the user interface 1600 to, e.g., provide a preview of the corresponding video for the as-defined question (and other selected options). In some embodiments, to generate the video, the system generates API calls to a video generation service passing the as-defined question and, optionally other data (e.g., a desired language, avatar selections or options, or the like) and, receiving, in response, the generated video content. As illustrated in FIGS. 16 and 17, the user interface 1600 may include various controls for playing the generated video, deleting the generated video, replacing the video with new video (e.g., with different options, text content, etc.), or the like. Providing a preview of the generated video during survey and question creation and modification makes efficient use of computing resources as a call provider is not required to wait until a survey is completely defined and generated for publication before being able to view the video content. In other words, the preview allows the call provider to make changes to individual questions as needed during survey creation and/or modification without having to waste generation of a complete survey before identifying issues or desired changes and going back or starting over to obtain a desired survey and associated content.

As illustrated in FIGS. 16 and 17, the user interface 1600 may also include an "attach" selection mechanism 1612. In response to receiving a selection of the selection mechanism 1612, the application may display various selection mechanisms for receiving a selection of a saved filed (e.g., a pdf) that may be associated with a survey or a particular question within a survey. For example, if a question in a survey asks about whether a user has seen or was presented with a particular document, the document (e.g., as a pdf) may be attached or otherwise associated with the question through the user interface 1600, which, during the survey, allows the user to access the referenced document and answer any presented questions regarding the document.

Figure 8:
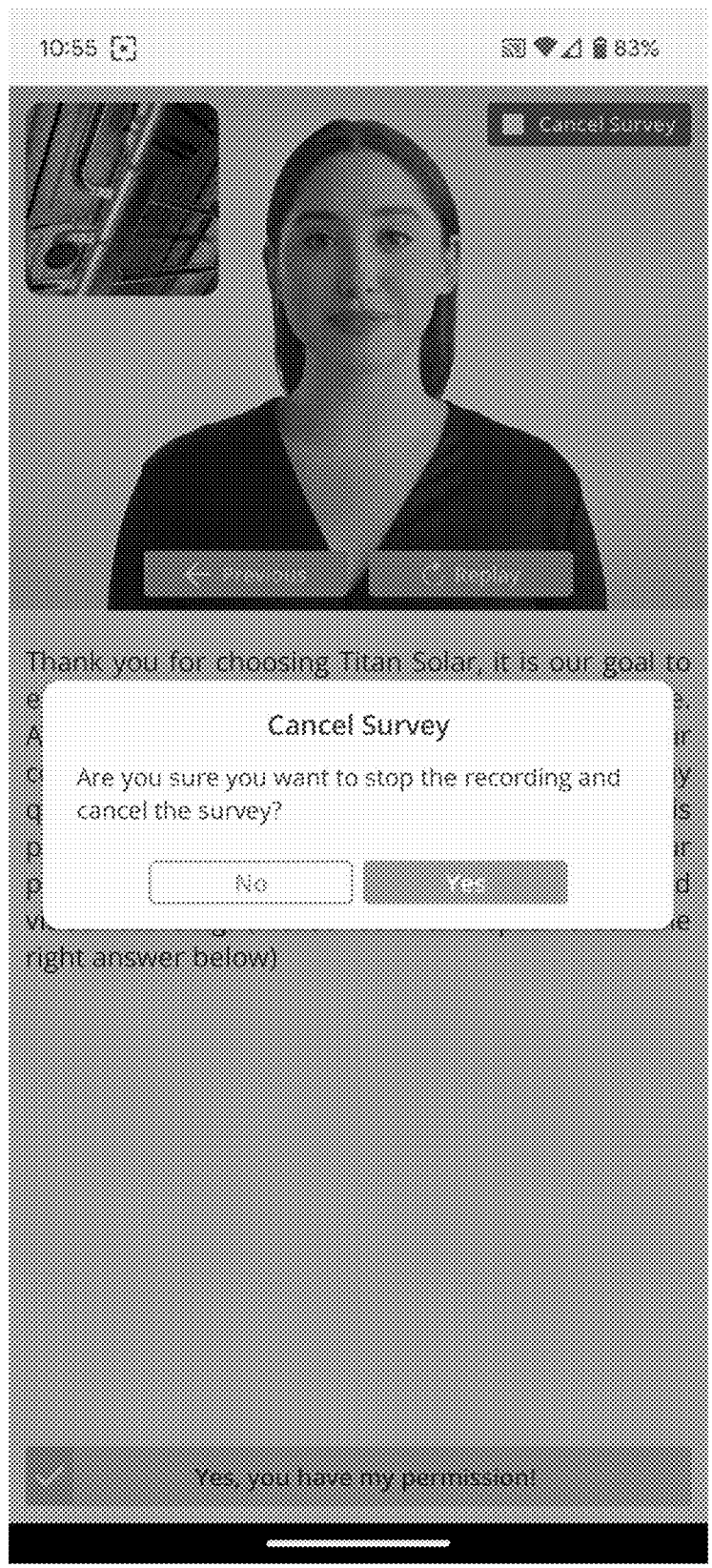
FIG. 8 illustrates a user interface provided via the verification system of FIG. 2 for canceling an in-progress survey according to some embodiments.
Figure 9:
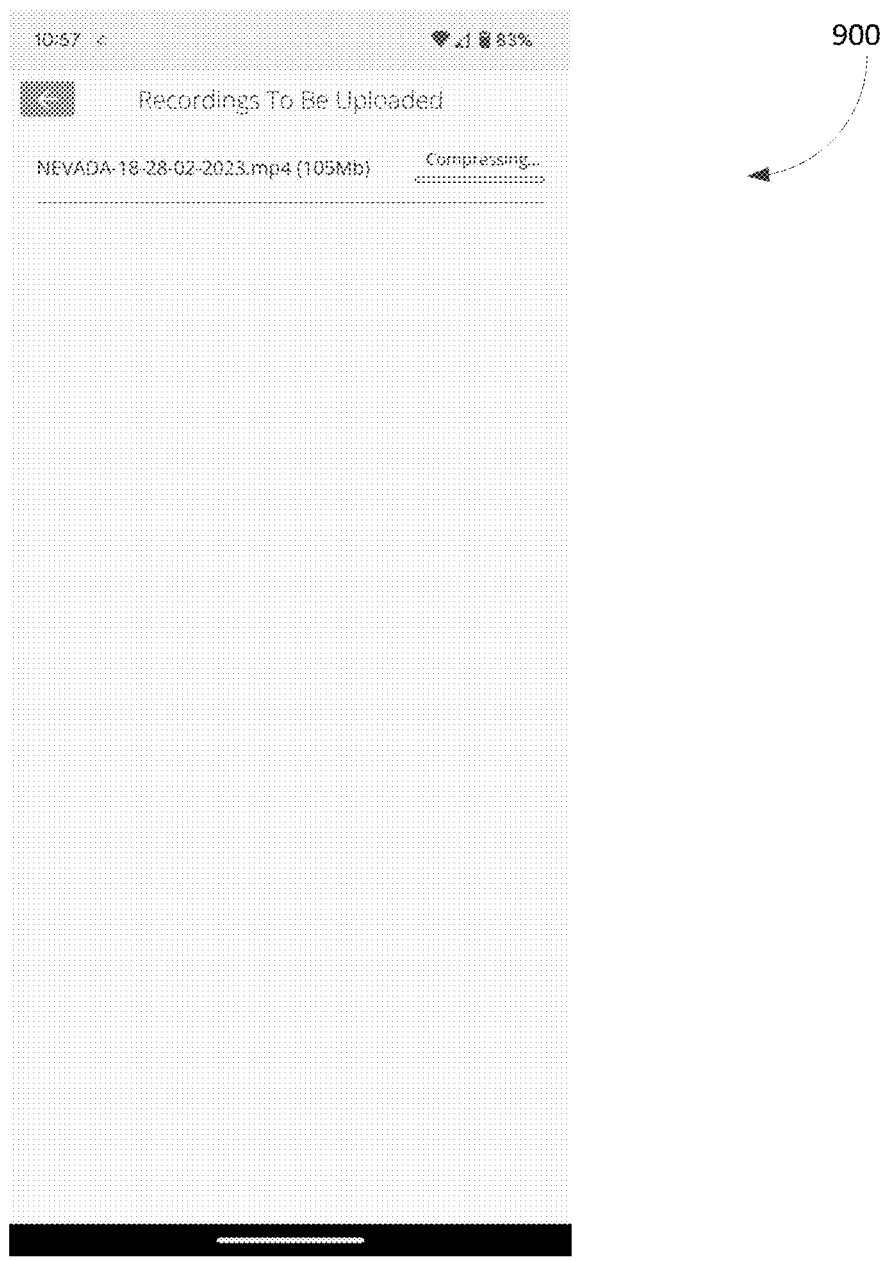
FIG. 9 illustrates a user interface provided via the verification system of FIG. 2 displaying an upload status of a survey according to some embodiments.
Figure 10:
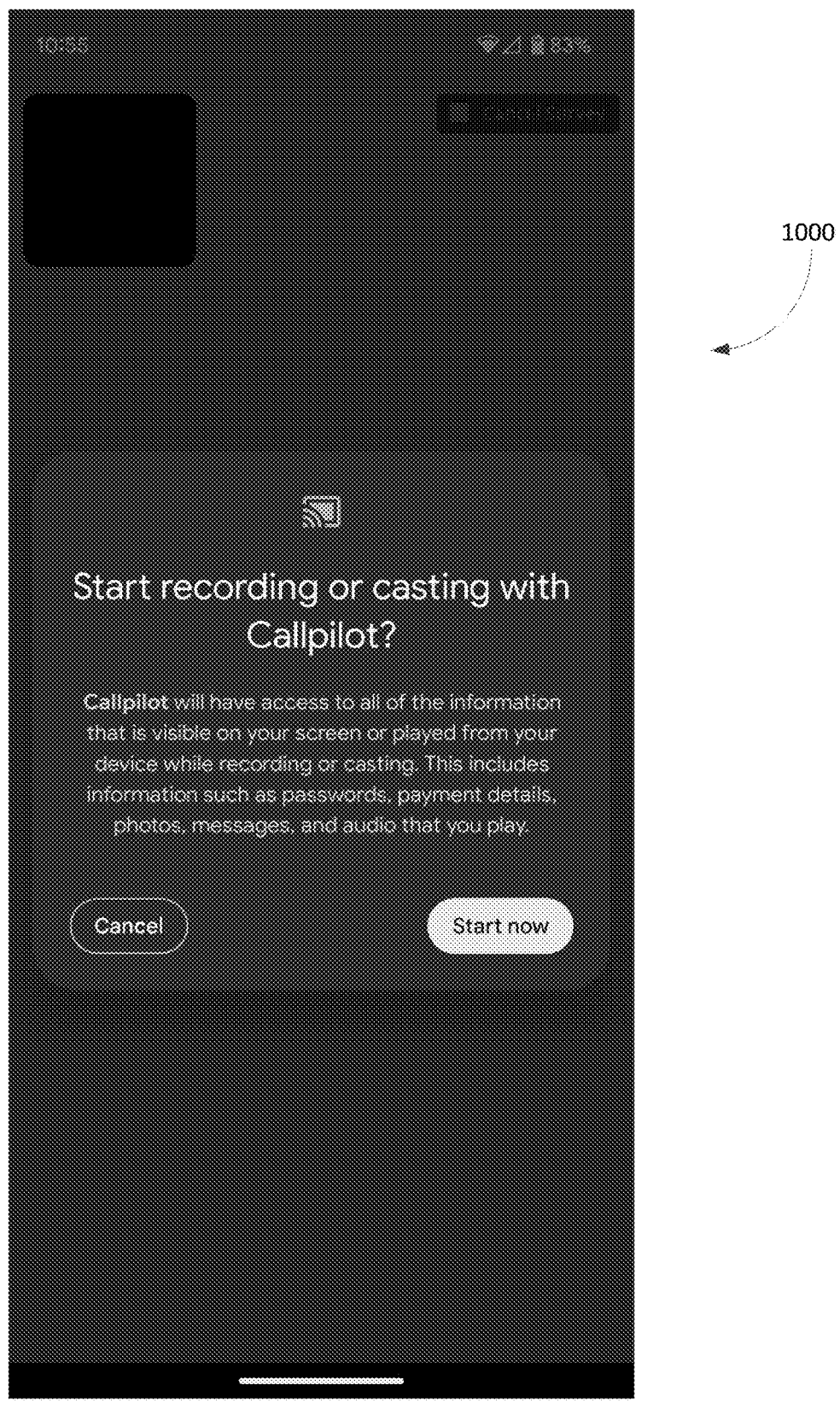
FIG. 10 illustrates a user interface provided via the verification system of FIG. 2 displaying a recording authorization prompt according to some embodiments.

As also described above, the systems and methods described herein control uploads to ensure that the recording function cannot be improperly circumvented. For example, partial recordings from surveys that are stopped before completion (e.g., whether manually stopped or crashing or other actions) are still uploaded (e.g., using a background or shut-down process that is not ended even when the application is closed or crashes). Also, when an end user completes a survey, the end user may leave the application during the upload process and the recording will continue to upload in the background. FIG. 8 illustrates a user interface 800 for canceling an in-progress call, and FIG. 9 illustrates a user interface 900 displaying a cache or status of surveys awaiting upload and, optionally, a status of each such upload. As illustrated in FIG. 9, in some embodiments, a recording (or portions thereof) may be compressed prior to being uploaded, which again makes efficient use of computing resources (e.g., bandwidth, memory, etc.). FIG. 10 illustrates a user interface 1000 that may be provided upon initial use of the application 350 (or each initiation of the application 350 or each initiation of a survey). As illustrated in FIG. 10, the user interface 1000 prompts the user to authorize the recording and capturing and casting of data displayed on the display 345 of the user's device 106. This authorization prompt documents the user's consent to the recording and capturing and casting of data and acts to warn the user to manage what is displayed as needed or desired to preserve the user's desired level or extent of privacy.

Figure 11:
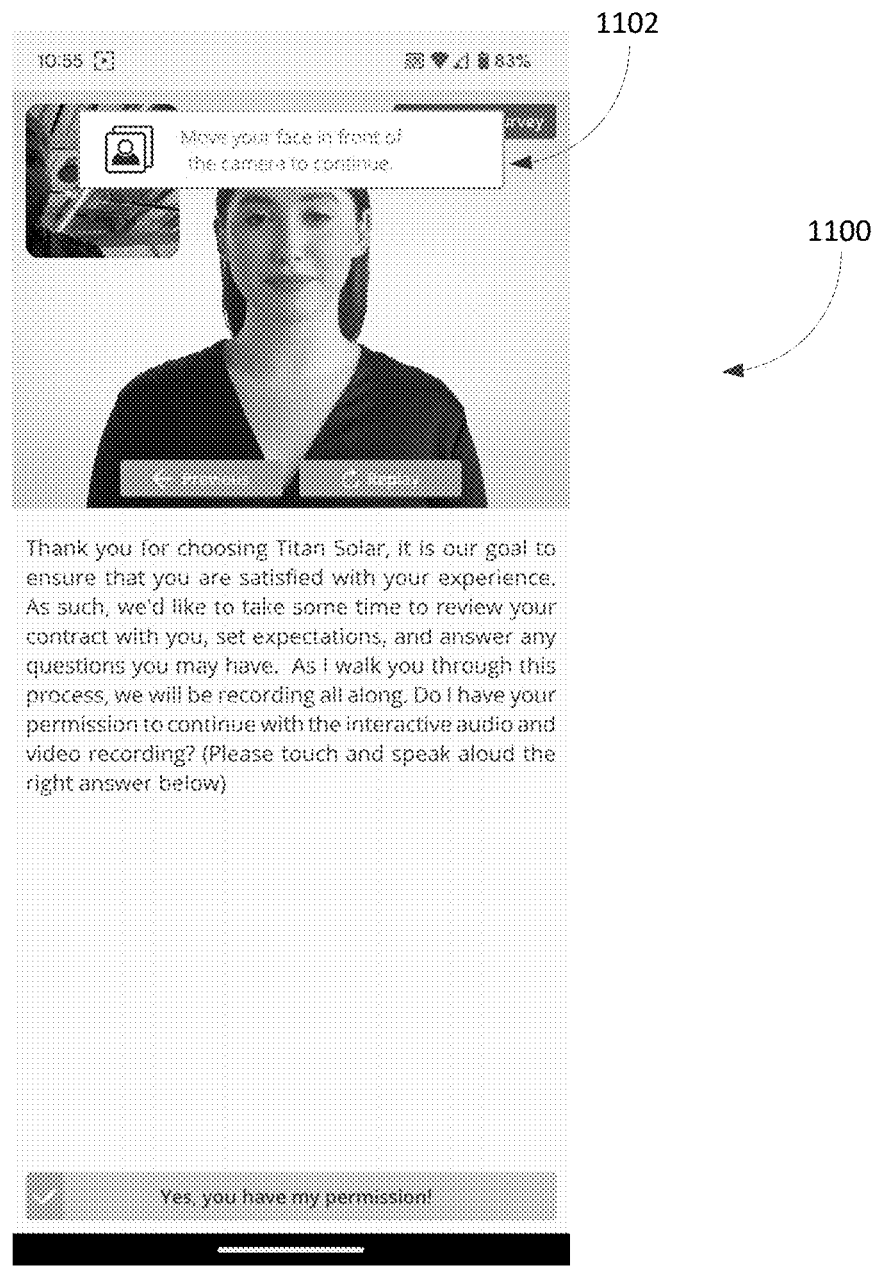
FIG. 11 illustrates a user interface provided via the verification system of FIG. 2 providing an instruction to move the user face back into frame according to some embodiments.
Figure 12:
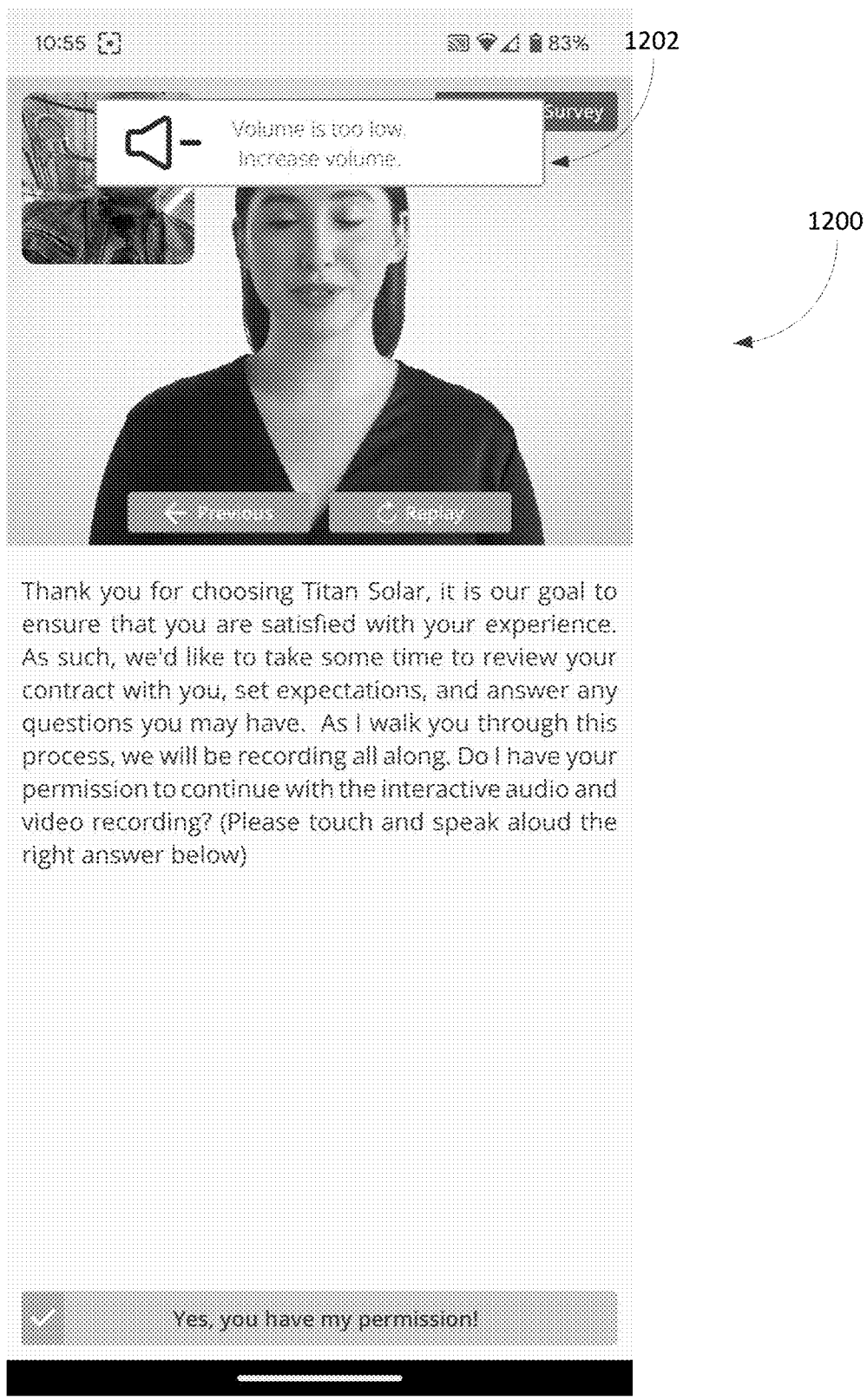
FIG. 12 illustrates a user interface provided via the verification system of FIG. 2 displaying an instruction to increase a volume level according to some embodiments.
Figure 13:
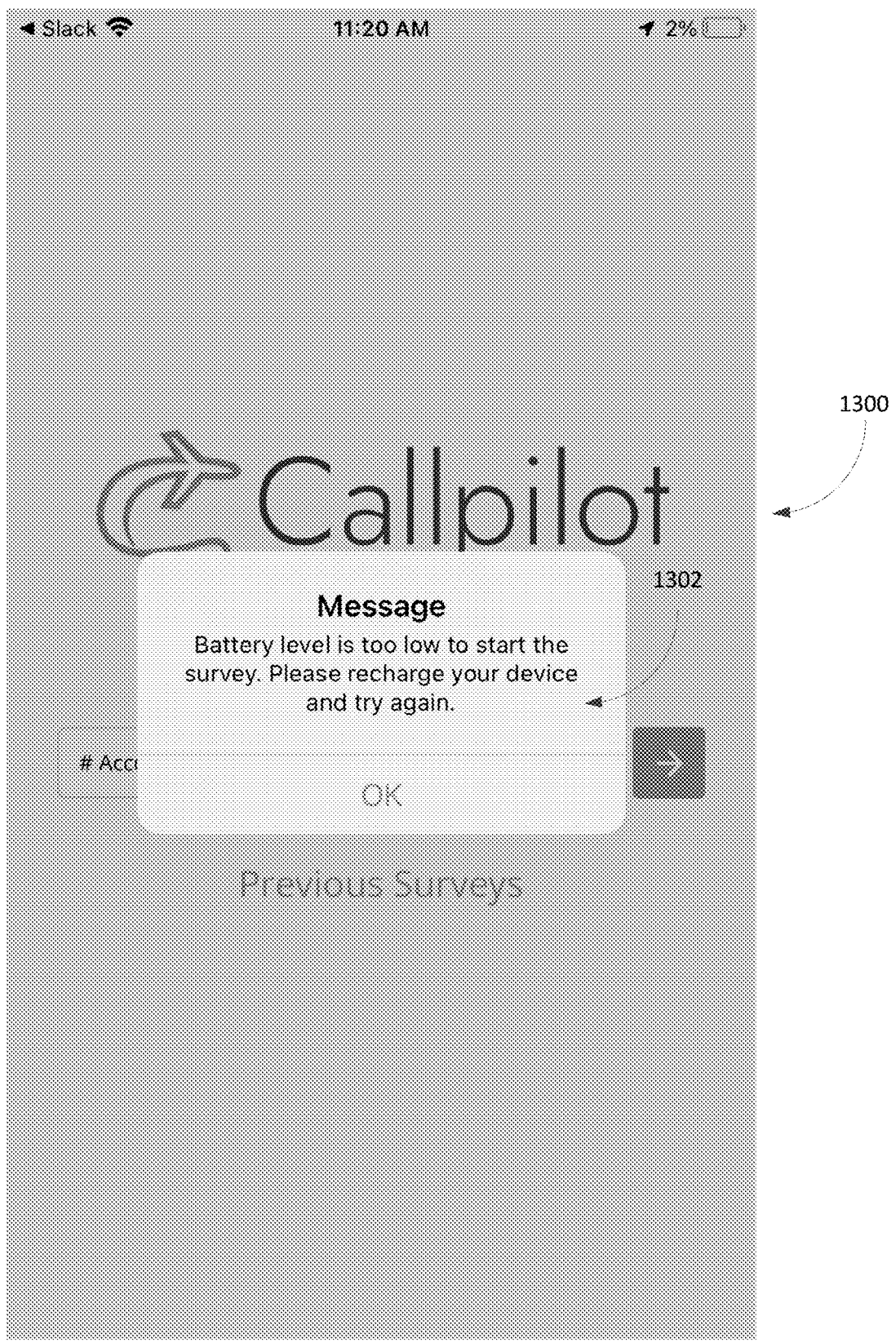
FIGS. 13 and 14 illustrates user interface provided via the verification system of FIG. 2 based on a detected battery level according to some embodiments.
Figure 14:
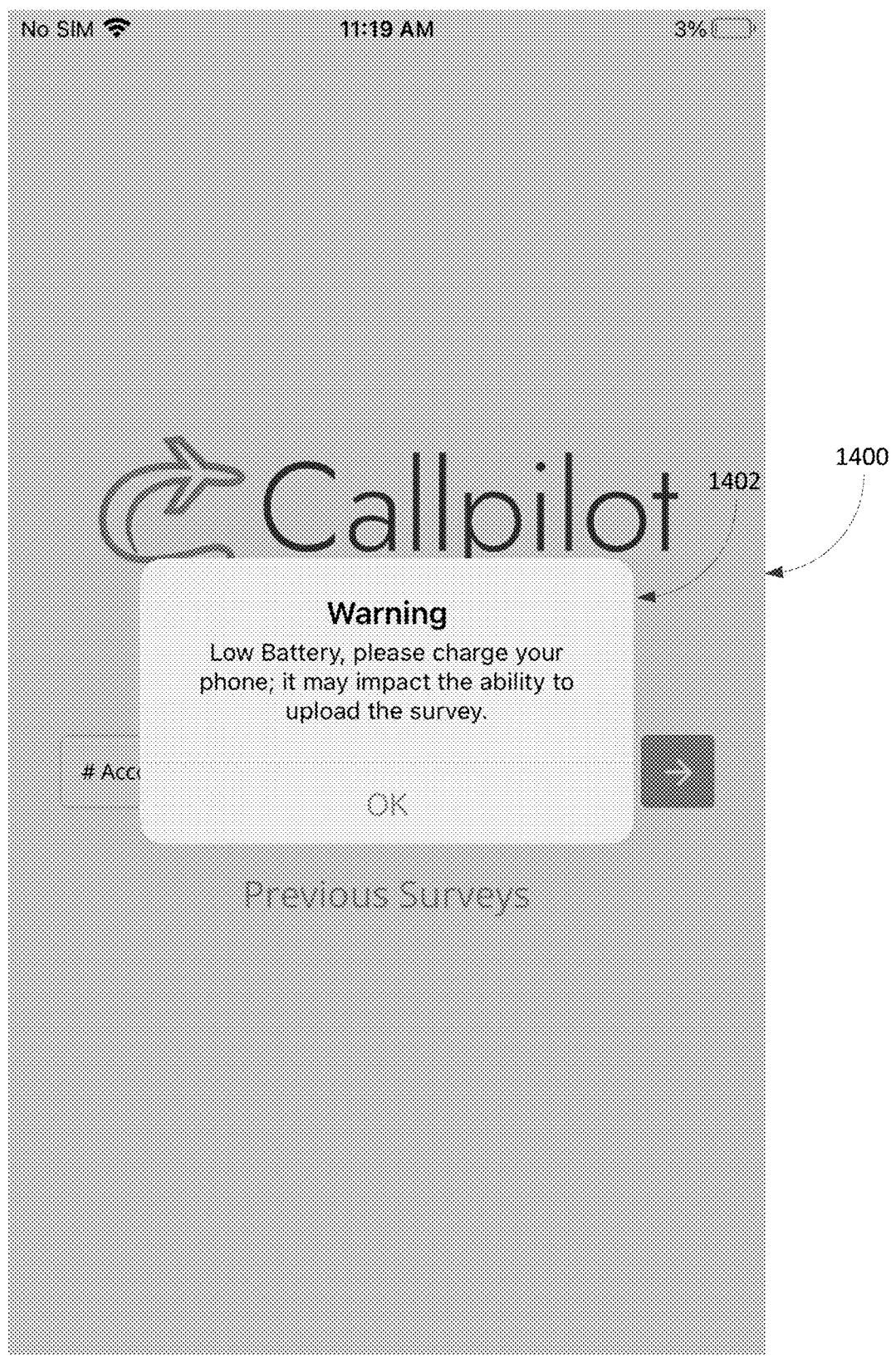

As also described herein, the application may be configured to detect when the captured video of the user does not include the user's face (e.g., one or two eyes, a nose, a mouth, or a combination thereof) and may automatically pause the call (and the recording) until the user corrects this issue (see, e.g., the user interface 1100 illustrated in FIG. 11, which displays a prompt 1102 instructing the user that the user must position their head in the camera's view (e.g., fully) before the call can continue). Similarly, the application may be configured to detect a volume level associated with the user's device and automatically pause the call (and the recording) until the volume level is at a predetermined threshold (see, e.g., the user interface 1200 illustrated in FIG. 12, which displays a prompt 1202 instructing the user to increase the device's volume before the call can continue). Also, in some embodiments, the application may be configured to detect a battery level of the user's device and prevent the user from starting a call, automatically pause an in-progress call (and associated recording), or both in response to the battery level being less than a predetermined level (see, e.g., the user interfaces 1300 and 1400 illustrated in FIGS. 13 and 14 and the associated prompts 1302 and 1402). In some embodiments, the application may only allow the call to proceed or start in response to the battery level reaching a predetermined level or in response to the user's device being plugged into a power source (e.g., a wall outlet, power brick, or the like). In other embodiments, as illustrated in the user interface 1400 of FIG. 14, the application may warn the user of a low battery level but may not prevent the user from starting or continuing with an in-progress call. In some embodiments, the provider of the call may specify what type of warning or constraint is provided by the application as part of configuring or customizing the call. For example, the application may allow the provider to specify facial detection constraints, predetermined volume levels, predetermined battery levels, and the like to customize how constraints are applied within the provider's survey.

Figure 15:
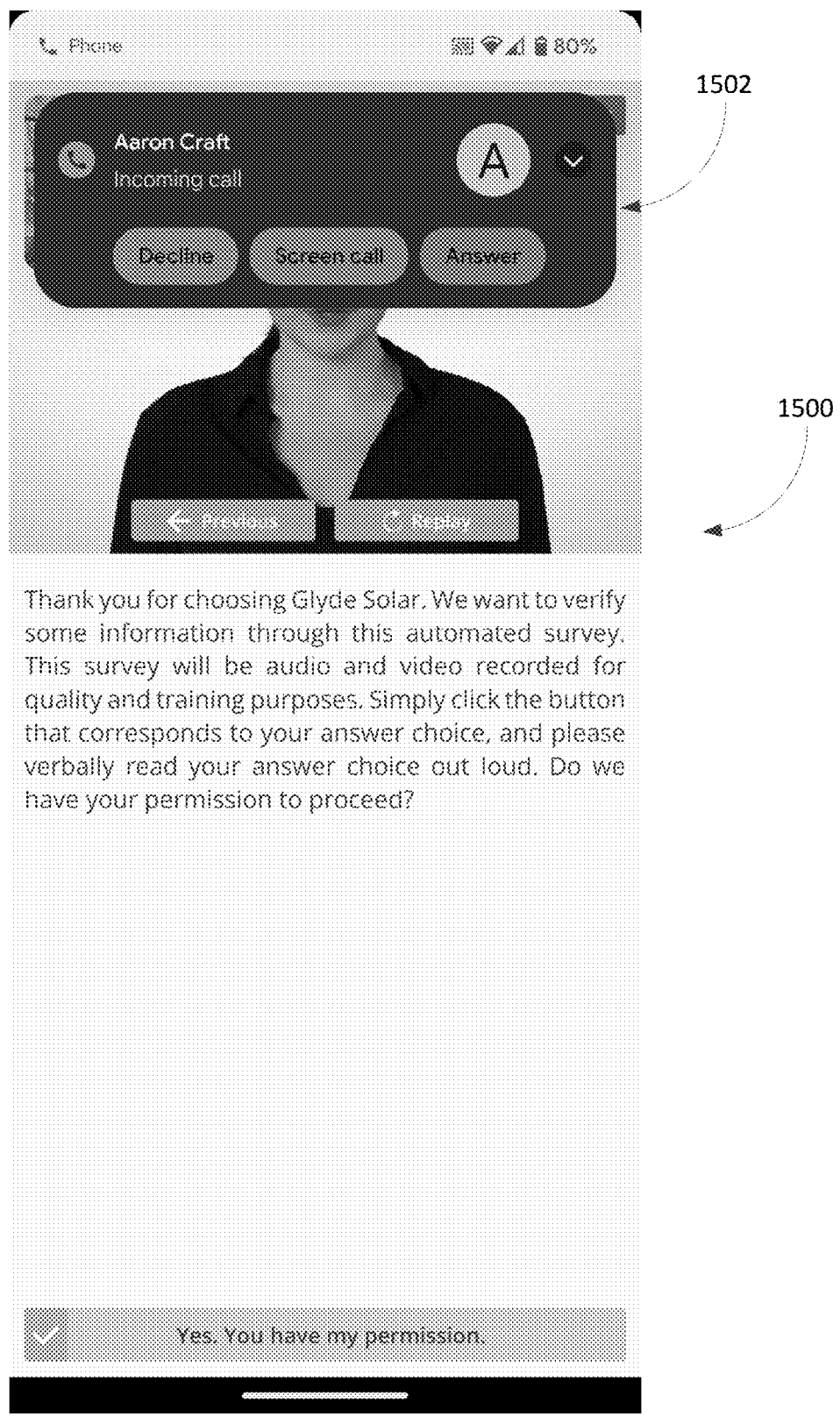
FIG. 15 illustrates a user interface provided via the verification system of FIG. 2 displaying an incoming communication notification according to some embodiments.

Furthermore, in some embodiments, the application is configured to automatically pause a call (and associated recording) in response to detecting a communication notification on the user's device, such as, for example, an incoming call (see, e.g., the user interface 1500 illustrated in FIG. 15 and the example communication notification 1502). The application may automatically resume the call if the user dismisses the notification 1502 or after the user terminates the incoming communication (e.g., ends the incoming call).

Figure 18:
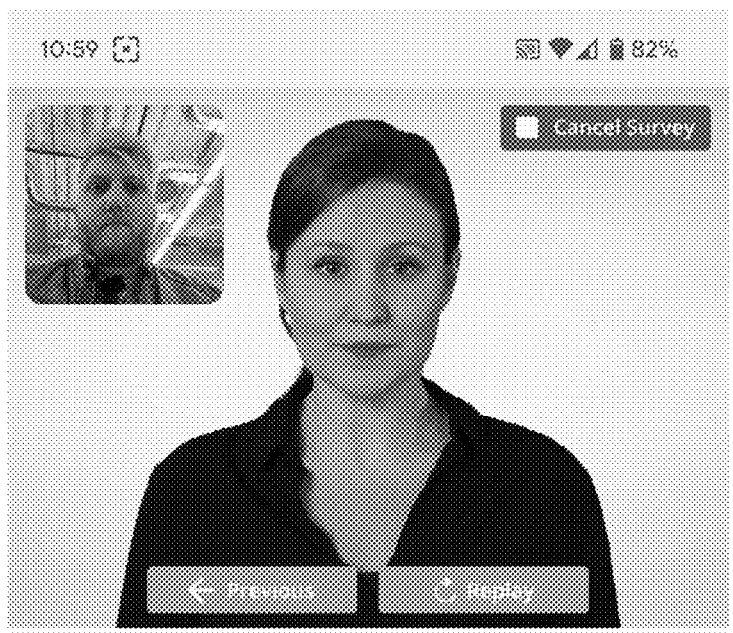
FIGS. 18, 19, and 20 illustrates user interface provided via the verification system of FIG. 2 for receiving inputs or updates to data provided during a survey according to some embodiments.
Figure 19:
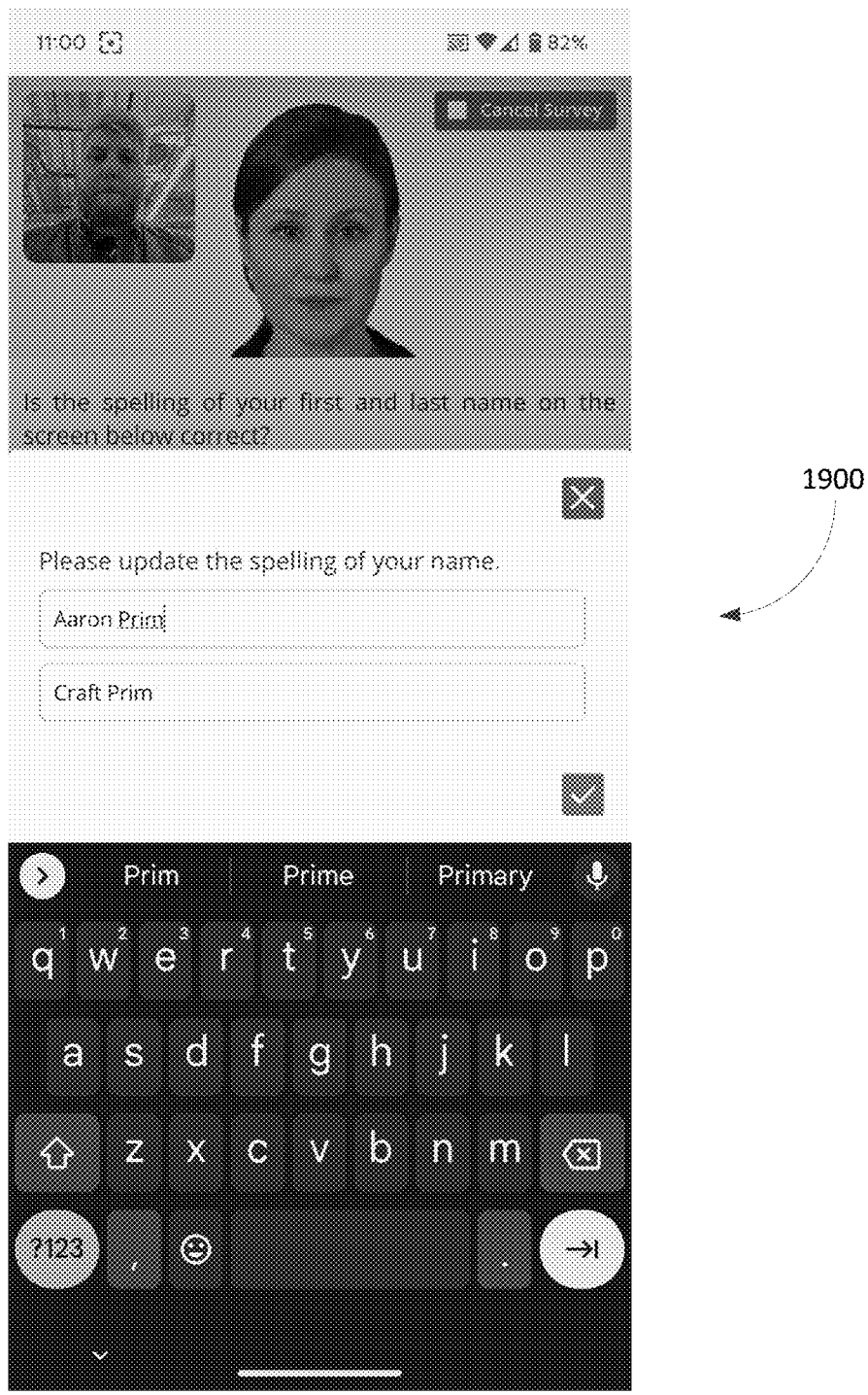
Figure 20:
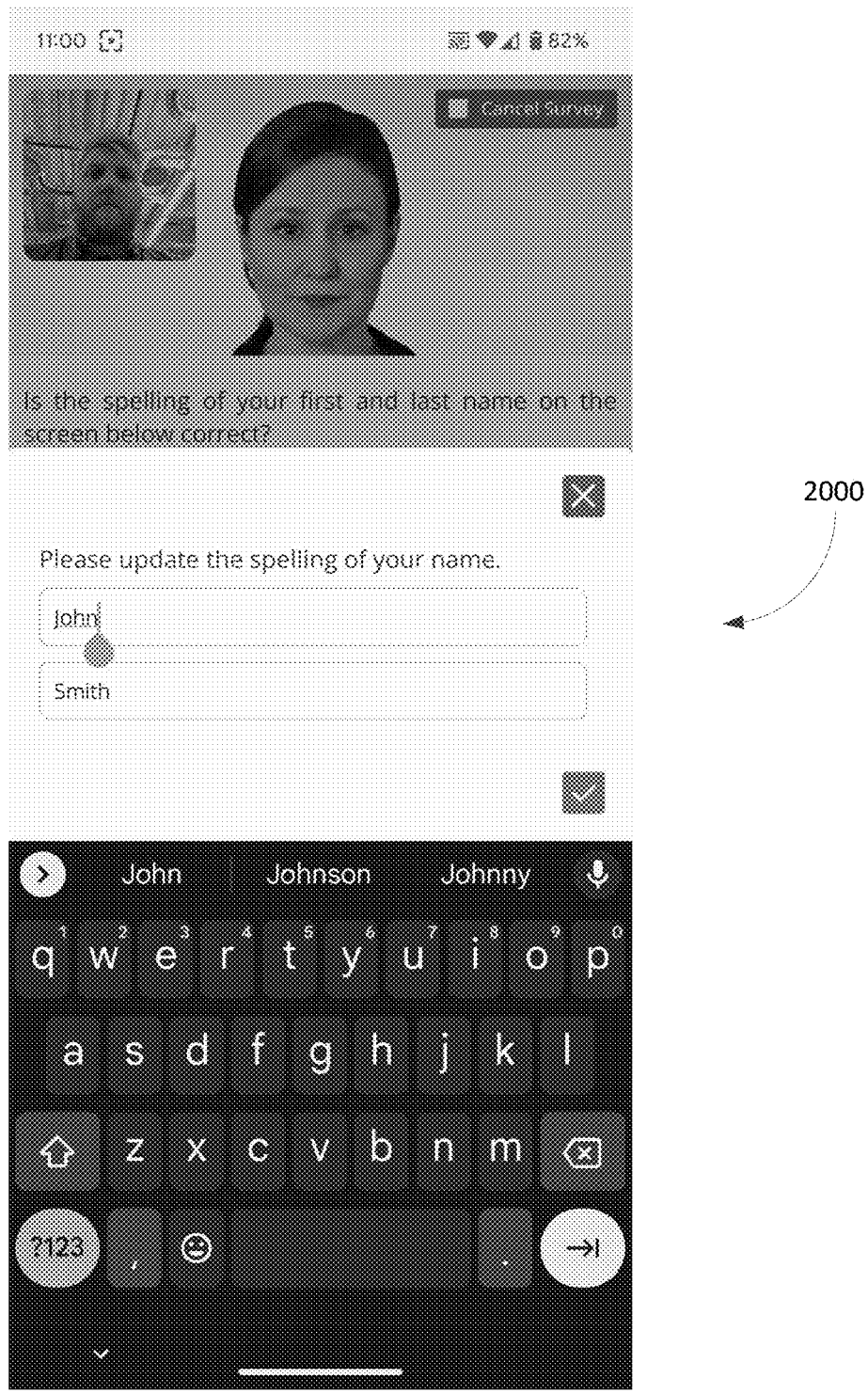

In some embodiments, the application provides the end user the option to input or update data within a survey, wherein the inputted or updated data is sent back to the system 100 (e.g., the server 102, one or more databases of the providers, or a combination thereof). For example, FIGS. 18, 19, and 20 illustrates user interfaces 1800, 1900, and 2000 for specifying whether displayed information is incorrect and, if incorrect, inputting additional or updated information. In some embodiments, this new or updated information may be provided to the server 102, a database of the call provider, or a combination thereof, such as, for example, in real-time or as part of uploading the recording. Accordingly, embodiments described herein provide systems and computer-implemented methods for conducting and generating a record of a digital interaction, which may represent a transaction, a meeting, coursework, a job interview, or the like. By using a software application install on an end user's phone or other type of user device, the end user can participate in a digital interaction (which may be between the end user and one or more other end users, the end user and an avatar or other generated content, or a combination there), which may include the presentation, within one or more user interfaces provided via the software application, of audio data, text data, visual data (including, e.g., video data), or a combination thereof.

In response the digital interaction starting, the software application is configured to continuously record the digital interaction on the user device, such as, for example, by capturing screen shots (e.g., a sequence of screen shots also referred to as a screen recording) of the one or more user interfaces displayed on the user device during the digital interaction. As illustrated in the figures described above, these user interfaces may present content (e.g., survey questions) as part of the digital interaction in one portion and may present captured image data (video data) of the end user (captured via a camera of the user device) in another portion. Accordingly, the screen recording may include both the content presented to the end user during the digital interaction (text data, user controls or selection or input mechanisms), video data, etc.) as well as the captured image data (video data) of the end user, which provides a clear link between these data components (e.g., without having to correlated separately stored end user image data with presented information during the digital interaction). When the digital interaction includes audio data, the audio data may also be recorded, which may be data provided via the user interfaces, data input by the end user via a microphone of the user device, or a combination thereof.

In response to the digital interaction ending (e.g., due to a completion of the digital interaction (completion of the survey, interview, etc.), the end user canceling the digital interaction, the software application crashing, or the end user exiting or terminating the software application), the software application (e.g., as part of a shut-down, exception, or background process of the application, a recovery process for the application, or a combination thereof) uploads the recording of the digital interaction from the user device to at least one server over at least one computer network. Thus, a record of the digital interaction is generated and stored separate from the user device to ensure that the digital interaction can be verified or otherwise reviewed as needed. In some embodiments, the recording (or portions thereof, including, for example, input provided via the end user during the digital interaction) may be uploaded during the digital interaction, such as, for example, in real-time, periodically, or in response to certain triggers (e.g., particular end user input). Thus, in some embodiments, in response to the end of the digital interaction, the recording may have already been uploaded and only remaining data or portions of the recording may need to be uploaded.

During the digital interaction, the end user may be prevented from pausing or stopping the recording (separate from or in combination with the digital interaction). This prevents the recording from being modified by the end user to capture only a portion of the digital interaction and, thus, not truly represent what occurred during the digital interaction. The software application, however, may be configured to pause the recording (and the associated digital interaction) in response to one or more conditions. For example, in some embodiments, the software application, during the digital interaction, performs facial recognition on the image data and determining whether a face of the end user is viewable in the image data. In determining whether the face of the end user is viewable in the image data, the software application may be configured to look for one or more particular facial features, which may or may not represent the entire face of the end user. In response to determining that the face of the end user is not viewable in the image data, the software application pauses the digital interaction and the recording of the digital interaction. The recording and associated interaction remain paused by the software application until the end user adjusts their position with respect to the camera capturing the image data, at which point, the software application resumes the digital interaction and the recording of the digital interaction. This functionality (pausing and resuming in response to whether the face of the end user is detected within the captured data) can be repeated as applicable during the digital interaction to ensure that the end user is present and participating in the digital interaction.

Similarly, in some embodiments, the software application determines, during the digital interaction, a volume setting of a microphone of the user device and compares the volume setting to a predetermined threshold. In response to determining that the volume setting is less than the predetermined threshold, the software application pauses the digital interaction and the recording of the digital interaction. This check ensure that any audio data associated with the digital interaction is audible. In response to determining that the volume setting is modified to satisfy the predetermined threshold while the digital interaction is paused, the software application resumes the digital interaction and the recording of the digital interaction. Again, this pausing and resuming functionality can be repeated as applicable during the digital interaction.

Also, in some embodiments, prior to the digital interaction starting, the software application determines a battery level of the user device and compares the battery level to a predetermined threshold. In response to determining that the battery level is less than the predetermined threshold, the software application may be configured to prevent the end user from starting of the digital interaction until the battery is charged to the predetermined threshold or until the user device is being charged. Similarly, the software application may be configured to pause an ongoing digital interaction and the associated recording in response to detecting a battery level below a predetermined threshold and may only resume the interaction and recording in response to the battery level reaching the predetermined threshold or the battery being actively charged.

In some embodiments, in response to the user device receiving an incoming communication (e.g., a call, a text, an application notification, etc.), which the software application may detect through the operating system on the user device, the software application is configured to pause the digital interaction and the recording of the digital interaction. For example, to prevent the recording of the digital interaction from including potentially personal or confidential information exchanged as part of the communication, the software application pauses the recording and the corresponding interaction. Similarly, pausing the recording and the corresponding interaction enables the end user to handle the communication and their redirect their attention to the digital interaction. In response to determining that the incoming communication being completed while the recording of the digital interaction is paused, the software application is configured to resume the digital interaction and the recording of the digital interaction. In some embodiments, the software application may be configured to prompt the end user to confirm when the communication has been completed and the end user is ready to resume the digital interaction and the corresponding recording.

As noted above, when creating and/or modifying a survey (or other content provided during the digital interaction), the provider may designate or flag portions of the digital interaction as portions that should not be recorded (e.g., introductions or closing remarks that do not need to be recorded and may make efficient use of bandwidth and memory). Accordingly, in response to a portion of the digital interaction being associated with a do-not-record flag (which may be an option or setting defined for a discrete portion of content provided during the digital interface), the software application is configured to pause the recording of the digital interaction for the portion of the digital interaction. In this situation, the digital interaction continues while the recording is paused and the recording is resumed in response to a subsequent portion of the digital interaction not be associated with the do-not-record flag.

As described above, the recording may be used to verify completion of a particular task or activity and a provider associated with a digital interaction may track some recording (e.g., through one or more dashboards). To provide the provider with useful information regarding recordings (i.e., digital interactions), the recording for a digital interaction may include more than a recording of the user interfaces, captured image data, and audio data associated with the interaction. For the recording (e.g., as metadata associated with a screen recording) may also include time and date information (e.g., when the interaction was started, any pauses, completion time for portions of the interaction or the entire interaction, upload time, etc.), location information (geographic information for the user device designating a location of the end user), user device information (e.g., a type, brand, model, etc. of the user device), or a combination thereof. In some embodiments, the recording also includes internet service provider information of the user device (e.g., what service provider is providing network connectivity to the user device for performing the digital interaction, uploading the recording, or both).

Accordingly, embodiments provided herein provide improved technology for delivering on-demand third-party verification (as well as other forms of verification) that, for example, uses face and volume detection to ensure accurate and useful recordings, performs location verification through collected geolocation information, provides online consent verifications, provides multi-lingual solutions/surveys, provides system security, a cloud-based infrastructure, or a combination thereof to provide improvements over existing verification technology. The cloud-based system can be used to present surveys or other information to customers (e.g., during the closing of a transaction) and can also be used to confirm the identity of a user and reduce fraud. Also, because both the provider side and end user side of the system can be accessed from any location, surveys can be created, modified, and conducted quickly and efficiently to avoid wasting computing resources as well as user resources.

In the foregoing description, various embodiments, examples, aspects, and features have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

What is claimed is:

1. A computer-implemented method of conducting and generating a record of a digital interaction conducted via an end user using a software application installed on a user device, the method comprising:
   in response the digital interaction starting, continuously recording the digital interaction on the user device, wherein recording the digital interaction includes storing: one or more user interfaces displayed on the user device during the digital interaction, image data captured via a camera of the user device during the digital interaction, and audio data included in the digital interaction;
   during the digital interaction, determining a volume setting of a microphone of the user device and comparing the volume setting to a predetermined threshold;
   in response to determining that the volume setting is less than the predetermined threshold, pausing the digital interaction and the recording of the digital interaction; and
   in response to the digital interaction ending, uploading the recording of the digital interaction from the user device to at least one server over at least one computer network.

2. The method of claim 1, wherein uploading the recording in response to the digital interaction ending includes uploading the recording in response to the end user canceling the digital interaction or terminating the software application.

3. The method of claim 1, wherein the one or more user interfaces provide one or more questions to the end user and wherein a portion of the one or more user interfaces displays the image data.

4. The method of claim 3, wherein the one or more questions are presented via at least one selected from a group consisting of text, audio, and video.

5. The method of claim 3, wherein the one or more user interfaces displays input provided via the end user during the digital interaction.

6. The method of claim 1, further comprising, during the digital interaction, performing facial recognition on the image data and determining whether a face of the end user is viewable in the image data.

7. The method of claim 6, further comprising, in response to determining that the face of the end user is not viewable in the image data, pausing the digital interaction and the recording of the digital interaction.

8. The method of claim 7, further comprising, in response to determining that the face of the end user becomes viewable in the image data while the digital interaction is paused, resuming the digital interaction and the recording of the digital interaction.

9. The method of claim 1, further comprising, in response to determining that the volume setting is modified to satisfy the predetermined threshold while the digital interaction is paused, resuming the digital interaction and the recording of the digital interaction.

10. The method of claim 1, further comprising, prior to the digital interaction starting, determining a battery level of the user device and comparing the battery level to a predetermined threshold.

11. The method of claim 10, further comprising, in response to determining that the battery level is less than the predetermined threshold, preventing the starting of the digital interaction.

12. The method of claim 1, further comprising, during the digital interaction, detecting an incoming communication received via the user device and, in response to detecting the incoming communication, pausing the digital interaction and the recording of the digital interaction.

13. The method of claim 12, further comprising, in response to determining that the incoming communication is completed while the recording of the digital interaction is paused, resuming the digital interaction and the recording of the digital interaction.

14. The method of claim 12, further comprising, in response to a portion of the digital interaction being associated with a do-not-record flag, pausing the recording of the digital interaction for the portion of the digital interaction.

15. The method of claim 1, wherein the recording further includes time and date information, location information, and user device information.

16. The method of claim 1, wherein the recording further includes internet service provider information of the user device.

17. The method of claim 15, further comprising, during the digital interaction, uploading data input via the end user to the at least one server.

18. A non-transitory, computer-readable medium storing instructions that, when executed by one or more electronic processors, performs a set of functions, the set of functions comprising:

in response a digital interaction starting using a software application installed on a user device, continuously recording the digital interaction on the user device, wherein recording the digital interaction includes storing: one or more user interfaces displayed on the user device during the digital interaction, image data captured via a camera of the user device during the digital interaction, and audio data included in the digital interaction;

during the digital interaction, determining a volume setting of a microphone of the user device and comparing the volume setting to a predetermined threshold;

in response to determining that the volume setting is less than the predetermined threshold, pausing the digital interaction and the recording of the digital interaction; and in response to the digital interaction ending, uploading the recording of the digital interaction from the user device to at least one server over at least one computer network.

\* \* \* \* \*